(12) United States Patent
Gaal et al.

(10) Patent No.: US 8,374,072 B2
(45) Date of Patent: Feb. 12, 2013

(54) EFFICIENT ZADOFF-CHU SEQUENCE GENERATION

(75) Inventors: Peter Gaal, San Diego, CA (US);
Robert J. Fuchs, San Diego, CA (US);
Yongbin Wei, San Diego, CA (US); Ke Liu, San Diego, CA (US); Hanfang Pan, San Diego, CA (US); Durga Prasad Malladi, San Diego, CA (US); Daniel T. Macek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 12/755,998

(22) Filed: Apr. 7, 2010

(65) Prior Publication Data

US 2011/0249548 A1    Oct. 13, 2011

(51) Int. Cl.
*H04J 11/00* (2006.01)
*H04W 4/00* (2009.01)

(52) U.S. Cl. .................... 370/206; 370/208; 370/329

(58) Field of Classification Search .................. None
See application file for complete search history.

(56) References Cited

U.S. PATENT DOCUMENTS

| | | | | |
|---|---|---|---|---|
| 2007/0195906 A1* | 8/2007 | Kim et al. | ...................... | 375/267 |
| 2008/0273582 A1* | 11/2008 | Gaal et al. | ...................... | 375/224 |
| 2009/0034468 A1* | 2/2009 | Muharemovic et al. | ...... | 370/330 |
| 2009/0080500 A1* | 3/2009 | Muharemovic et al. | ...... | 375/146 |
| 2009/0080550 A1* | 3/2009 | Kushioka | ...................... | 375/260 |
| 2010/0166106 A1* | 7/2010 | Kameya | ...................... | 375/295 |
| 2010/0195479 A1* | 8/2010 | Lipka et al. | ...................... | 370/203 |
| 2010/0284265 A1* | 11/2010 | Ogawa et al. | ................. | 370/208 |
| 2011/0182266 A1* | 7/2011 | Iwai et al. | ...................... | 370/329 |

FOREIGN PATENT DOCUMENTS

WO    WO 2009084222 A1    7/2009

OTHER PUBLICATIONS

International Search Report and Written Opinion—PCT/US2011/031166, ISA/EPO—Jul. 15, 2011.
Chu, D. C., "Polyphase Codes with Good Periodic Correlation Properties," IEEE Transactions on Information Theory, pp. 531-532, Jul. 1972.

* cited by examiner

*Primary Examiner* — Clemence Han

(57) ABSTRACT

Efficient apparatus and method for Zadoff-Chu ("Chu") sequence generation avoids additional processing and hardware complexity of conventional quadratic generating formula followed by Discrete Fourier Transform (DFT) with a reference signal generator that produces both a Zadoff-Chu sequence and its DFT. In the wireless communication system (e.g., Long Term Evolution (LTE) system), Chu sequences are extensively used, especially in the uplink (UL). Because of the single carrier operating mode, transmitting a Chu sequence in principle involves a succession of generating that sequence, performing a DFT operation and then an IFFT operation. Assuming that the sequence length is N, the initial sequence generation requires 2N multiplications and the DFT requires more than N log 2(N) multiplications. Given the frequent processing of Chu sequences, this would represent a complexity burden. The invention makes it possible to perform the sequence generation and DFT steps without any multiplication operation, except for possibly calculating certain initial parameters.

42 Claims, 21 Drawing Sheets

US 8,374,072 B2

EFFICIENT ZADOFF-CHU SEQUENCE GENERATION

BACKGROUND

1. Field

The subject disclosure relates generally to wireless communication and, more particularly, to on-time generation of Zadoff-Chu sequences and computer generated sequences.

2. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receiver(s) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_V$ independent channels, which are also referred to as spatial channels, where $N_V \leq \min\{N_T, N_R\}$. Each of the $N_V$ independent channels corresponds to a dimension. The MIMO system can provide improved performance (e.g., higher throughput, greater capacity, or improved reliability) if the additional dimensionalities created by the multiple transmit and receive antennas are utilized.

A Zadoff-Chu sequence is a complex-valued mathematical sequence which, when applied to radio signals, gives rise to an electromagnetic signal of constant amplitude, whereby cyclically shifted versions of the sequence comprising the signal do not cross-correlate with each other when the signal is recovered at the receiver. A generated Zadoff-Chu sequence that has not been shifted is known as a "root sequence". The sequence then exhibits the useful property that cyclic-shifted versions of itself remain orthogonal to one another, provided, that is, that each cyclic shift, when viewed within the time domain of the signal, is greater than the combined propagation delay and multi-path delay-spread of that signal between the transmitter and receiver. Zadoff-Chu sequence is known as a CAZAC sequence (constant amplitude zero autocorrelation waveform). Zadoff-Chu sequences are used in the 3GPP LTE (Long Term Evolution) air interface in the definition of pilot signals ("reference signals" (RS)), random access preamble (PRACH) and HARQ ACK/NACK responses on Physical Uplink Control Channel (PUCCH).

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject innovation provides that system(s) and apparatus(es) are provided to wireless communication reference signals are generated in two ways. The first way used for 1 and 2 resource block allocations as well as PUCCH (uplink control channel) spreading consists of arbitrary standard defined sequences stored in random access memory (RAM). The second is with Zadoff-Chu sequences that are generated when needed. A reference signal generator generates post discrete Fourier transform (DFT) reference signals, taking advantage of a relationship between the frequency and time domain versions of the reference signals. This will allow the reference symbol to bypass the DFT engine and the PUCCH signal path to bypass the DFT engine. This will allow the DFT engine clock to be off for power savings.

In one aspect, a method is provided for generation of a reference signal for wireless communication by employing a processor executing computer executable instructions stored on a computer readable storage medium to implement the following acts. A reference sequence is generated in frequency domain. Cyclic time shifts are generated for a time domain transform of the frequency domain reference sequence by generating a phase ramp sequence. A communication signal is processed using the frequency domain reference signal and time domain transform of the reference signal.

In another aspect, a computer program product is provided for generation of a reference signal for wireless communication comprises at least one computer readable storage medium storing computer executable instructions that when executed by at least one processor implement components. A set of codes causes a computer to generate a reference sequence in frequency domain. A set of codes causes the computer to generate cyclic time shifts for a time domain transform of the frequency domain reference sequence by generating a phase ramp sequence. A set of codes causes the computer to process a communication signal using the frequency domain reference signal and time domain transform of the reference signal.

In an additional aspect, an apparatus is provided for generation of a reference signal for wireless communication. At least one computer readable storage medium stores computer executable instructions that when executed by at least one processor implement a means for generating a reference sequence in frequency domain. A means is implemented for generating cyclic time shifts for a time domain transform of the frequency domain reference sequence by generating a phase ramp sequence. Means are implemented for processing a communication signal using the frequency domain reference signal and time domain transform of the reference signal.

In a further aspect, an apparatus is provided for generation of a reference signal for wireless communication. A processor operatively coupled to a computer readable medium having stored there on the following computer executable components. A component generates a reference sequence in frequency domain. A component generates cyclic time shifts for a time domain transform of the frequency domain reference sequence by generating a phase ramp sequence. A component processes a communication signal using the frequency domain reference signal and time domain transform of the reference signal.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
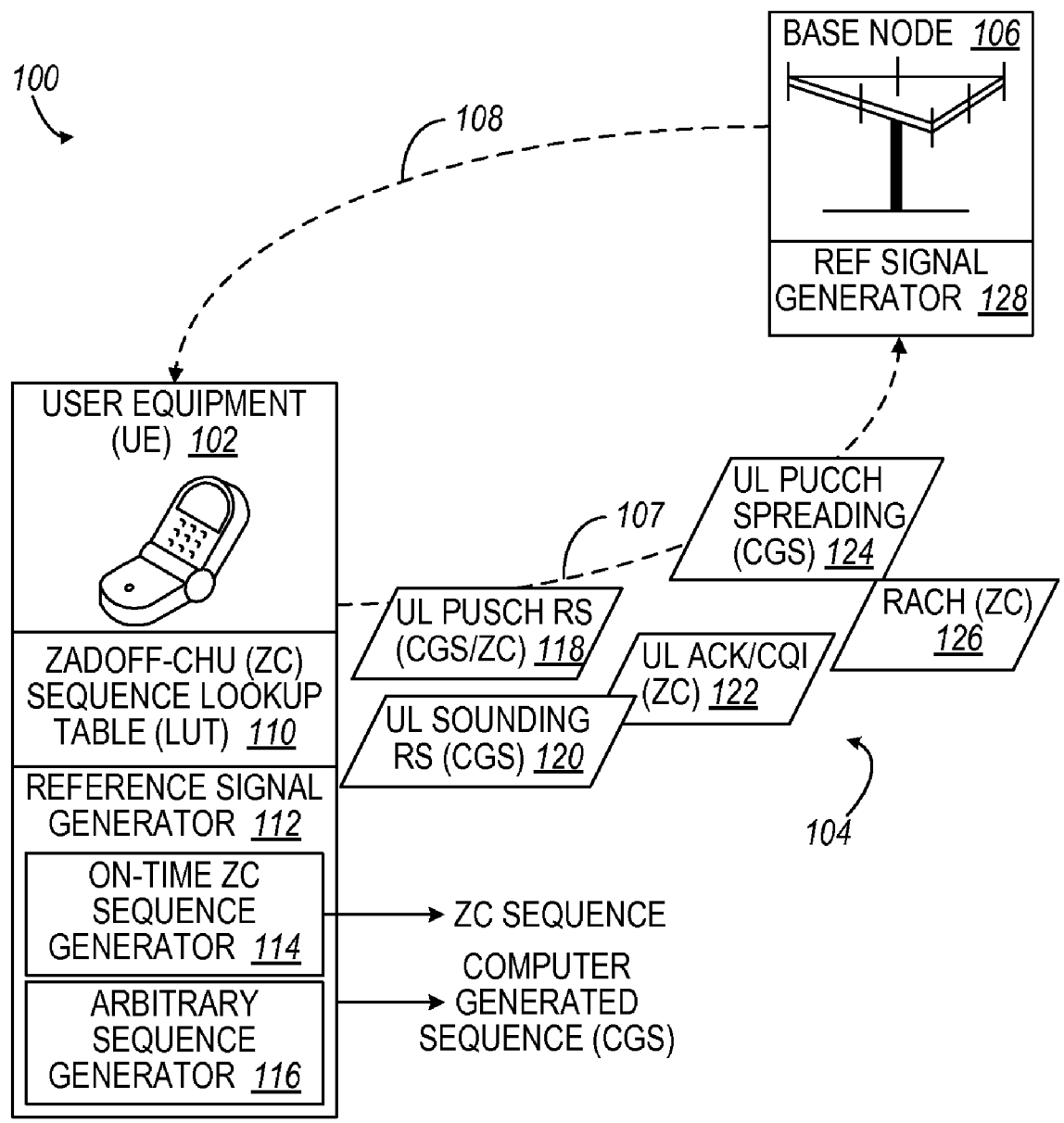
FIG. 1 depicts a block diagram of a wireless communication system wherein a transmitting entity and receiving entity both incorporate on-time reference signal generation.

Efficient apparatus and method for Zadoff-Chu ("Chu") sequence generation avoids additional processing and hardware complexity of conventional quadratic generating formula followed by Discrete Fourier Transform (DFT) with a reference signal generator that produces both a Zadoff-Chu sequence and its DFT. In the wireless communication system (e.g., Long Term Evolution (LTE) system), Chu sequences are extensively used, especially in the uplink (UL). Because of the single carrier operating mode, transmitting a Chu sequence in principle involves a succession of generating that sequence, performing a DFT operation and then an IFFT operation. Assuming that the sequence length is N, the initial sequence generation requires 2N multiplications and the DFT requires more than N log 2(N) multiplications. Given the frequent processing of Chu sequences, this would represent a complexity burden. The invention makes it possible to perform the sequence generation and DFT steps without any multiplication operation, except for possibly calculating certain initial parameters.

As used in this application, the terms "system," "component," "module," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms "code" and "symbol sequence," or the simpler term "sequence," are intended to convey the same notion and are employed interchangeably. It is to be noted that in the subject specification the term "code" is also utilized to indicate "computer programming code." The context of the passages of this description wherein "code" is employed conveys to one of ordinary skill in the art the intended meaning for the subject term; in instances where the context may not be sufficiently clear an explicit reference to the meaning of the term "code" is provided.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, customer premises equipment, or user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals, and with other base stations through backhaul network communication. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point (AP), Node B, evolved Node B (eNodeB), evolved base station (eBS), access network (AN) or some other terminology.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

With reference to FIG. 1, a wireless communication system 100 that utilizes reference signals, which can comprise or be created from Zadoff-Chu (ZC) sequence for a first communicating entity 102 to encode or spread a signal 104 that is decoded or despread by a second communicating entity 106. In an illustrative aspect, the first communicating entity 102 is a mobile terminal or user equipment (UE) transmitting on an uplink 107 and the second communicating entity 106 comprises a base station or base node. However, it should be appreciated that applications exist as well on a downlink 108.

For instance, a ZC sequence lookup table (LUT) 110 can provide an efficient source of a reference signal for shorter sequences that do not require a large local storage or can be readily downloaded on the downlink 108. Alternatively or in addition, a reference signal generator 112 can provide on-time generation, especially for longer sequences. In an illustrative implementation, the reference signal generator 112 uses an on-time ZC sequence generator 114 and an arbitrary sequence generator 116 to produce a computer generated sequence (CGS) or a ZC sequence. For example, these sequences can be used for an uplink (UL) PUSCH (uplink shared channel) reference signal (RS) 118, UL sounding RS 120, UL ACK/CQI 122, UL PUCCH (uplink control channel) spreading 124, and RACH (random access channel) 126. The base node 106 can include a reference sequence generator 128 to receive these channels.

First, the DFT operation is skipped by directly generating the spectrum of the Chu sequence, which itself is a Chu sequence but with different parameters. Second, to generate a Chu sequence either in the time or in the frequency domain, a recursive formula is used instead of the regular quadratic-exponential formula. Third, in order to perform extension or truncation of the Chu sequence, the recursive formula is stopped earlier or later than the Chu sequence period. In this way, memory copy and transfer operations can be avoided, which otherwise would be required for the extension operation. Fourth, the cyclic shift of the final time domain sequence is performed as a phase ramp in the frequency domain, which requires no additional operations beyond initializing register content in the case of using the recursive generation method.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 2:
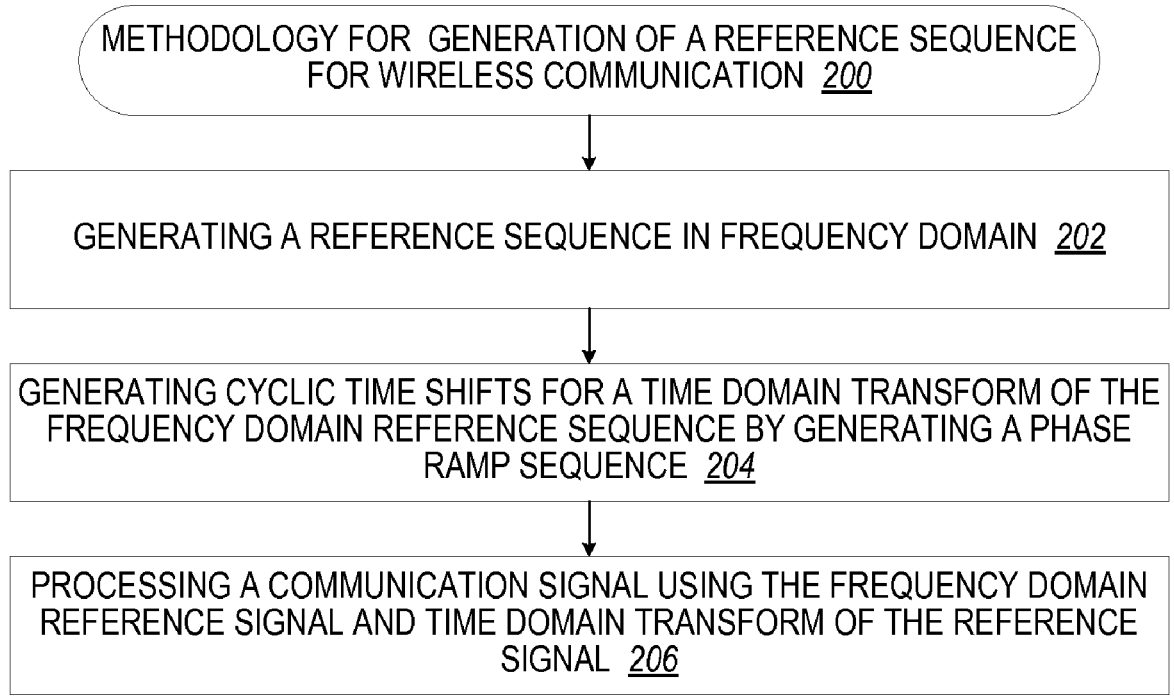
FIG. 2 depicts a flow diagram for a methodology or sequence of operations for a wireless communication system to generate reference sequences.

In FIG. 2, a methodology or sequence of operations 200 is provided for simultaneous generation of frequency and time domain Chu sequence for use in wireless communication. For instance, a processor can be employed for executing computer executable instructions stored on a computer readable storage medium to implement the following acts. In block 202, a reference sequence is generated in frequency domain. In block 204 cyclic time shifts are generated for a time domain transform of the frequency domain reference sequence by generating a phase ramp sequence. In block 206, a communication signal is processed using the frequency domain reference sequence and time domain transform of the reference sequence. For instance, UE can process by encoding a reference signal or spreading a signal using the reference sequence. As another instance, a base node can process by decoding or despreading using the reference sequence.

Figure 3:
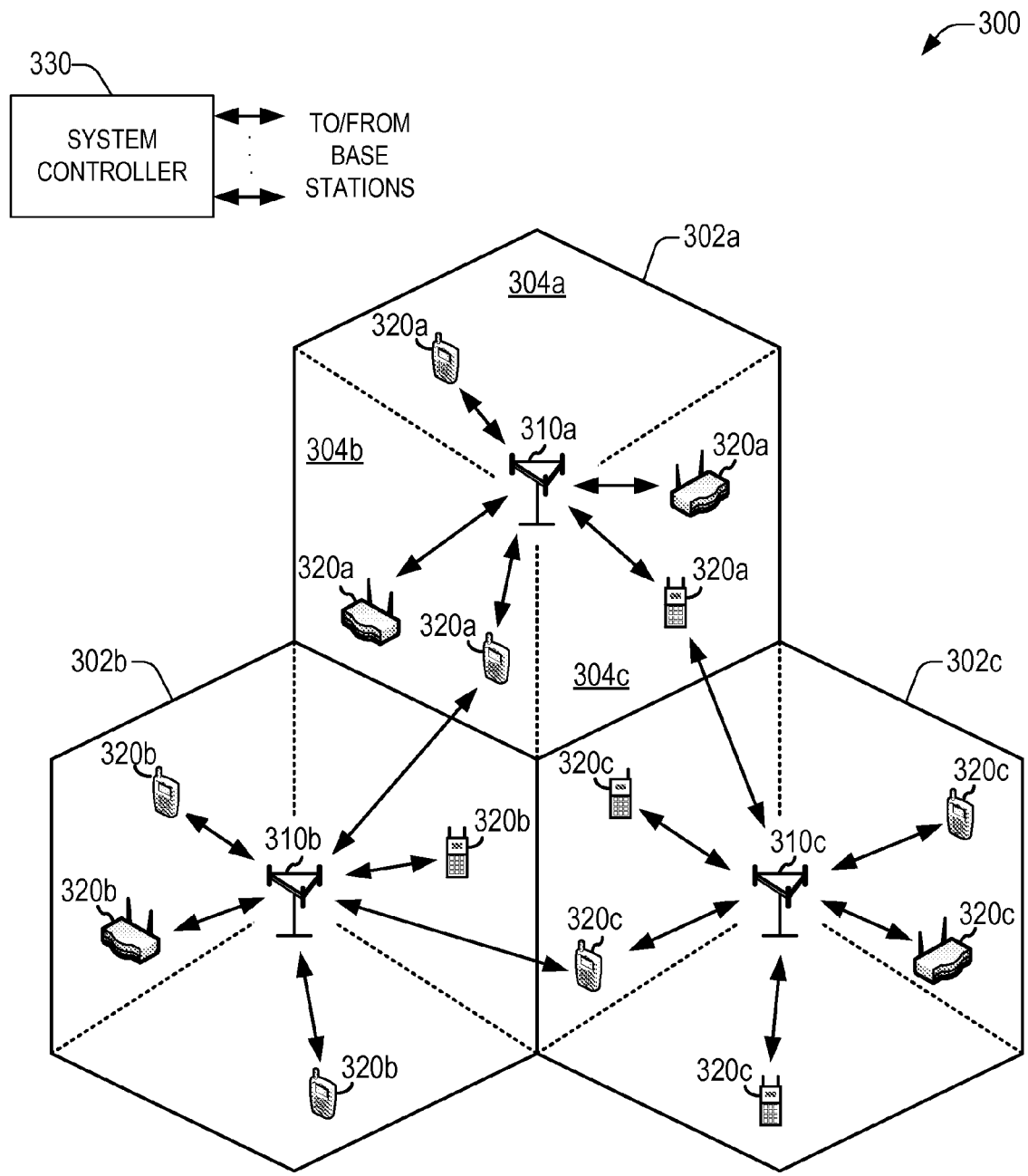
FIG. 3 depicts a block diagram of a wireless multiple-access communication system.

Referring now to the drawings, FIG. 3 is an illustration of a wireless multiple-access communication system 300 in accordance with various aspects disclosed in the subject specification. In one example, the wireless multiple-access communication system 300 includes multiple base stations 310a-310c and multiple terminals 320a-320c. Further, one or more base stations 310a-310c can communicate with one or more terminals 320. By way of non-limiting example, a base station (e.g., base station 310a) can be an access point, a Node B, and/or another appropriate network entity. Each base station 310 provides communication coverage for a particular geographic area 302a-c. As used herein and generally in the art, the term "cell" can refer to a base station (e.g., 310a) and/or its coverage area (e.g., 302a) depending on the context in which the term is used.

To improve system capacity, the coverage area 302a, 302b, or 302c corresponding to a base station 310 can be partitioned into multiple smaller areas (e.g., areas 304a, 304b, and 304c). Each of the smaller areas 304a-304c can be served by a respective base transceiver subsystem (BTS, not shown). As used herein and generally in the art, the term "sector" can refer to a BTS and/or its coverage area depending on the context in which the term is used. As an example, sectors 304a, 304b, 304c in cell 302a (or cells 302b and 302c) can be formed by groups of antennas (not shown) at a base associated with such sector (e.g., base station 310a), where each group of antennas is responsible for communication with terminals 320a-c in a portion of cell 302a, 302b, or 302c. Such utilization of a specific group of antennas is known as beamforming, wherein multiple antennas are employed to transmit a signal in a directed, localized pattern. For example, base station 310 serving cell 302a can have a first antenna group corresponding to sector 304a, a second antenna group corresponding to sector 304b, and a third antenna group corresponding to sector 304c. In an aspect, each sector 304a, 304b, and 304c in sectorized cell 302a (or cells 302b and 302c) can have a sector identifier. Such an identifier can be acquired during cell search. It should be appreciated that various aspects of the innovation described herein can be used in a system having sectorized or unsectorized cells since cell acquisition occurs among a base station and one or more terminals 320a-c irrespective of sectorization. Furthermore, all suitable wireless communication networks having substantially any number of sectorized or unsectorized cells are intended to fall within the scope of the hereto appended claims.

For simplicity, the term "base station" (or other terminology that indicates "base station") as employed herein can refer both to a station that serves a sector as well as a station that serves a cell. While the following description generally relates to a system in which each terminal communicates with one serving access point for simplicity, it should be appreciated that terminals can communicate with any number of serving base stations.

In accordance with one aspect, terminals 320a-c can be dispersed throughout the system 300. Each terminal 320a-c can be stationary or mobile. By way of non-limiting example, a terminal can be an access terminal (AT), a mobile station, user equipment, a subscriber station, a wireless device, a cellular phone, a personal digital assistant (PDA), a wireless modem, a handheld device, or another appropriate device that communicates wirelessly.

As an example, the system 300 can utilize a centralized architecture by employing a system controller 330 that can be coupled to one or more base stations 310a-c and provide coordination and control for the base stations 310a-c. In accordance with alternative aspects, system controller 330 can be a single network entity or a collection of network entities. Additionally, the system 300 can utilize a distributed architecture to allow the base stations 310 to communicate with each other as needed. In one example, system controller 330 can additionally contain one or more connections to multiple networks. These networks can include the Internet, other packet based networks, and/or circuit switched voice networks that can provide information to and/or from terminals 320 in communication with one or more base stations 310 in system 300. In another example, system controller 330 can include or be coupled with a scheduler (not shown) that can schedule transmissions to and/or from terminals 320. Alternatively, the scheduler can reside in each individual cell 302, each sector 304, or a combination thereof.

In an example, system 300 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 320 are orthogonalized by transmitting in different time intervals. FDMA utilizes frequency division multiplexing (FDM), wherein transmissions for different terminals 320a-c are orthogonalized by transmitting in different frequency subcarriers. For instance, TDMA and FDMA systems can also use code division multiplexing (CDM), wherein transmissions for multiple terminals can be orthogonalized using different orthogonal codes (e.g., Walsh codes, Gold codes, Kasami codes, Zadoff-Chu sequences) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 300 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 310a-c and terminals 320a-c in system 300 can communicate data using one or more data channels and signaling using one or more control channels. Data channels utilized by system 300 can be assigned to active terminals 320 such that each data channel is used by only one terminal at any given time. Alternatively, data channels can be assigned to multiple terminals 320, which can be superimposed or orthogonally scheduled on a data channel. To conserve system resources, control channels utilized by system 300 can also be shared among multiple terminals 320 using, for example, code division multiplexing. In one example, data channels orthogonally multiplexed only in frequency and time (e.g., data channels not multiplexed using CDM) can be less susceptible to loss in orthogonality due to channel conditions and receiver imperfections (e.g., systematic errors in time offsets) than corresponding control channels.

In accordance with an aspect, system 300 can employ centralized scheduling via one or more schedulers implemented at, for example, system controller 330 and/or each base station 310. In a system utilizing centralized scheduling, scheduler(s) can rely on feedback from terminals 320 to make appropriate scheduling decisions. As an example, such feedback can include an offset added to receive other sector interference information in order to allow the scheduler to estimate a supportable reverse link peak rate for a terminal 320a-c, from which such feedback is received, and to allocate system bandwidth accordingly.

Figure 4:
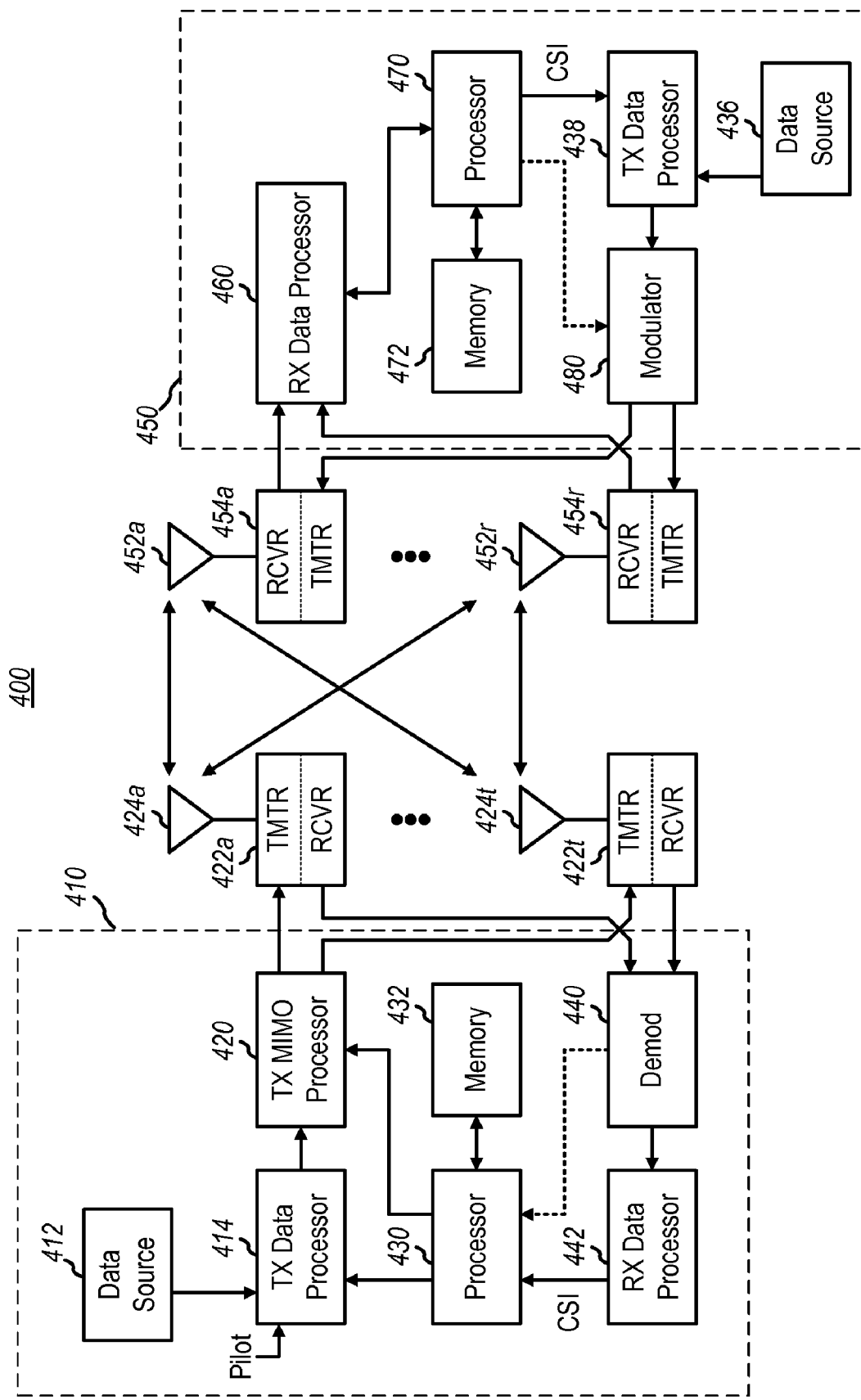
FIG. 4 depicts a block diagram of a multiple-input-multiple-output (MIMO)-capable communication system.

With reference to FIG. 4, in a MIMO-capable communication system 400, a transmitter system 410 (e.g., evolved node (eNB) or base station) and a receiver system 450 (e.g., access terminal, user equipment (UE)) are depicted. At the transmitter system 410, traffic data for a number of data streams can be provided from a data source 412 to transmit (TX) data processor 414. In an embodiment, each data stream is transmitted over a respective transmit antenna. TX data processor 414 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM)) selected for that data stream to provide modulation symbols. The data rate, coding, and modulation for each data stream may be determined by instructions executed by processor 430; the instructions as well as the data may be stored in memory 432. To the accomplishment of that end, processor 430 can rely on instructions and data structures stored in memory 432.

The modulation symbols for all data streams are then provided to a TX MIMO processor 420, which may further process the modulation symbols (e.g., OFDM). TX MIMO processor 420 then provides $N_T$ modulation symbol streams to $N_T$ transceiver (TMTR/RCVR) $422_A$ through $422_T$. In certain embodiments, TX MIMO processor 420 applies beamforming weights (or precoding) to the symbols of the data streams and to the antenna from which the symbol is being transmitted. Each transceiver 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $422_A$ through $422_T$ are then transmitted from $N_T$ antennas $424_A$ through $424_T$, respectively. At receiver system 450, the transmitted modulated signals are received by $N_R$ antennas $452_A$ through $452_R$ and the received signal from each antenna 452 is provided to a respective transceiver (RCVR/TMTR) $454_A$ through $454_R$. Each transceiver $454_A$-$454_R$ conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ transceivers $454_A$-$454_R$ based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410. A processor 470 periodically determines which pre-coding matrix to use; such a matrix can be stored in memory 472. Processor 470 formulates a reverse link message comprising a matrix index portion and a rank value portion. Memory 472 may store instructions that when executed by processor 470 resulting in formulating the reverse link message. The reverse link message may comprise various types of information regarding the communication link or the received data stream, or a combination thereof. As an example, such information can comprise an adjusted communication resource, an offset for adjusting a scheduled resource, and information for decoding a data packet format. The reverse link message is then processed by a TX data processor 438, which also receives traffic data for a number of data streams from a data source 436, modulated by a modulator 480, conditioned by transceiver $454_A$ through $454_R$, and transmitted back to transmitter system 410. In addition, processor 470 can process received synchronization channels according, at least in part, to the functionalities associated with synchronization channel processing component. To the accomplishment of the latter, processor 470 can rely on code instruction and algorithms stored in memory 472.

At transmitter system 410, the modulated signals from receiver system 450 are received by antennas $424_A$-$424_T$, conditioned by transceivers $422_A$-$422_T$, demodulated by a demodulator 440, and processed by a RX data processor 442 to extract the reserve link message transmitted by the receiver system 450. Processor 430 then determines which pre-coding matrix to use for determining the beamforming weights and processes the extracted message.

Single-user (SU) MIMO mode of operation corresponds to the case in which a single receiver system 450 communicates with transmitter system 410, as illustrated in FIG. 4 and according to the operation described above. It should be appreciated that in the subject mode of operation, inter-cell power can be effected as described hereinbefore. In a SU-MIMO system, the $N_T$ transmitters $424_A$-$424_T$ (also known as TX antennas) and $N_R$ receivers $452_A$-$452_R$ (also known as RX antennas) form a matrix channel (e.g., Rayleigh channel, or Gaussian channel) for wireless communication. The SU-MIMO channel is generally described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to $\min\{N_T, N_R\}$. A MIMO channel formed by the $N_T$ transmit and $N_R$ receive antennas may be decomposed into $N_V$ independent channels, which are also referred to as spatial channels, where $N_V \leq \min\{N_T, NR\}$. Each of the $N_V$ independent channels corresponds to a dimension or communication layer.

In one aspect, transmitted/received symbols with OFDM, at tone ω, can be modeled by:

$$y(\omega)=\underline{H}(\omega)c(\omega)+n(\omega). \qquad \text{Eqn. 1}$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 410, and $N_V$ can be scheduled at the discretion of the transmitter based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 410 allocates to transmit each data stream $N_V$. In view of the forward link/reverse link reciprocity of a wireless channel, it should be appreciated that a transmission from MIMO receiver 450 can also be modeled in the fashion of Eqn. 1, including substantially the same elements. In addition, receiver 450 can also apply pre-coding schemes prior to transmitting data in the reverse link.

In system 400 (FIG. 4), when $N_T=N_R=1$, the system reduces to a single-input single-output (SISO) system that can provide for sector communication in a wireless communication environment in accordance with one or more aspects set forth herein. Alternatively, a single-input multiple output (SIMO) mode of operation corresponds to $N_T>1$ and $N_R=1$. Furthermore, when multiple receivers communicate with transmitter system 410, a multiuser (MU) MIMO mode of operation is established.

With regard to using ZC sequences in a MIMO-capable system, it should be appreciated that ZC sequences are used for Uplink RS (reference signals), Uplink ACK and CQI (channel quality indicators), and potentially uplink sounding RS. Advantageously, a generation of ZC sequences can support features for sequence planning, sequence hopping within a group, and cyclic shift hopping. In particular, such generation can be achieved per hop at both the eNB and UE without having to perform a large, brute force LUT (Look Up Table). As it will be appreciated with the benefit of the present disclosure, on-time generation can support these needs, especially without having to perform a two-step generation of a Chu sequence followed by a Discrete Fourier Transform (DFT) of the Chu sequence.

In an illustrative scenario, consider what the number of ZC sequences are given allowing for all DFT sizes between 12 and 1296 in increments of 12, that can be factorized as powers of {2, 3, 5}. This results in the number of possible sizes being 35. It has been proposed that the number be somewhat further restricted to 12 to 1200 perhaps depending on guard tones for larger bandwidth. The number of ZC sequences for a given length can be determined based upon a definition of a Chu sequence:

$$x(n) = \exp(-j \cdot pi \cdot \xi \cdot n \cdot (n+1)/N), \quad \text{Eqn. 2}$$

where $\xi$ and N need to be mutually prime and $(\xi, N)=1$. Thus, given N, one can pick all prime numbers between 1 and N−1 for $\xi$.

Figure 5:
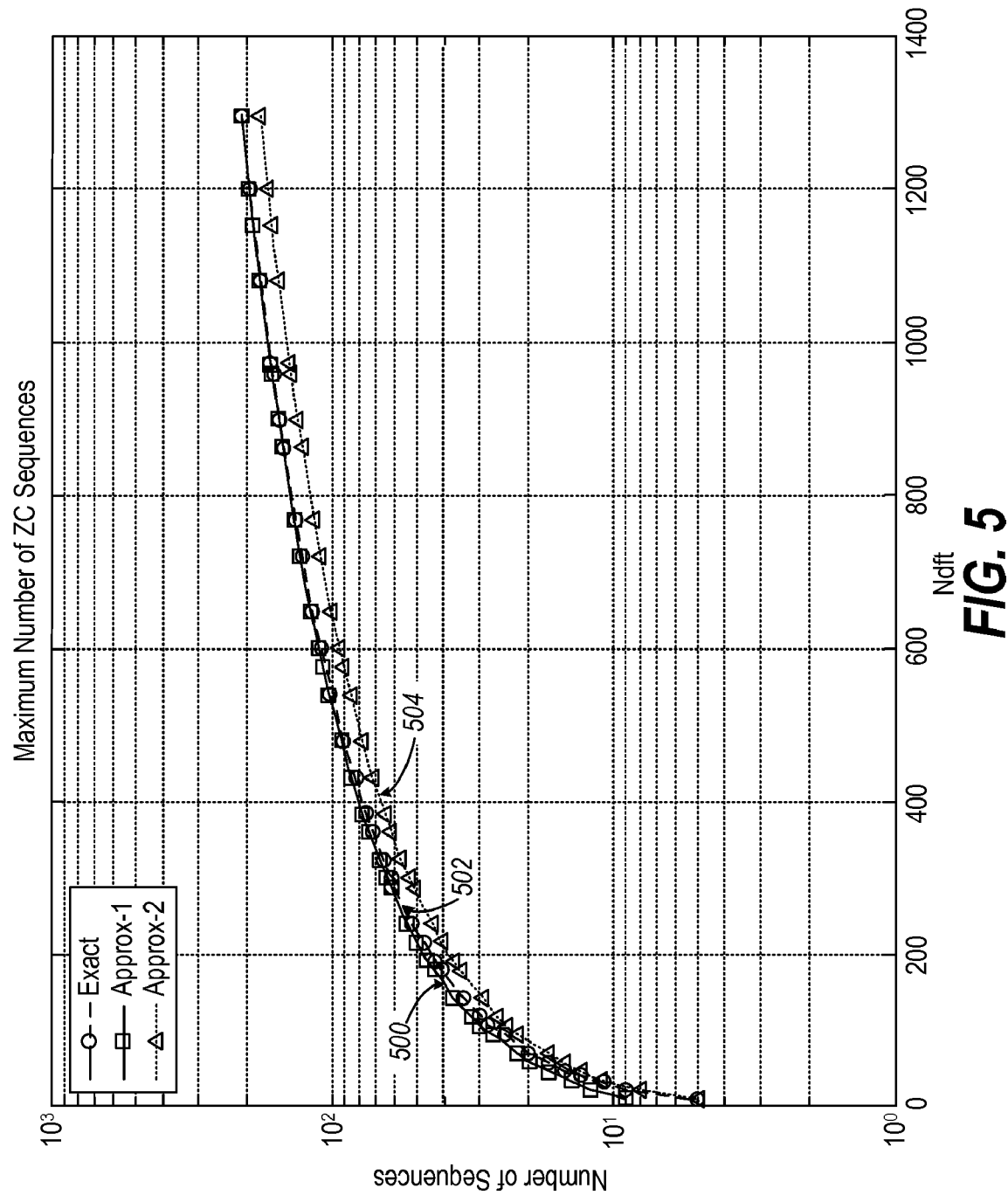
FIG. 5 depicts a graphical plot of maximum number of Zadoff-Chu (ZC) sequences based upon a sequence length.

With reference to FIG. 5, from prime number theorem, we know that the number of primes between 1 and N, which is depicted by an exact plot 500, can be approximated as:

"Approximation 1" depicted at 502:
$p(N) \sim N/(\log(N)-1) \Leftrightarrow$ better for large values of N;
"Approximation 2" depicted at 504:
$p(N) \sim N/\log(N) \Leftrightarrow$ better for small values of N.

For a given N, we need all prime numbers between 1 and N−1, which ranges from 5 (N=12) to 210 (N=1296).

Figure 6:
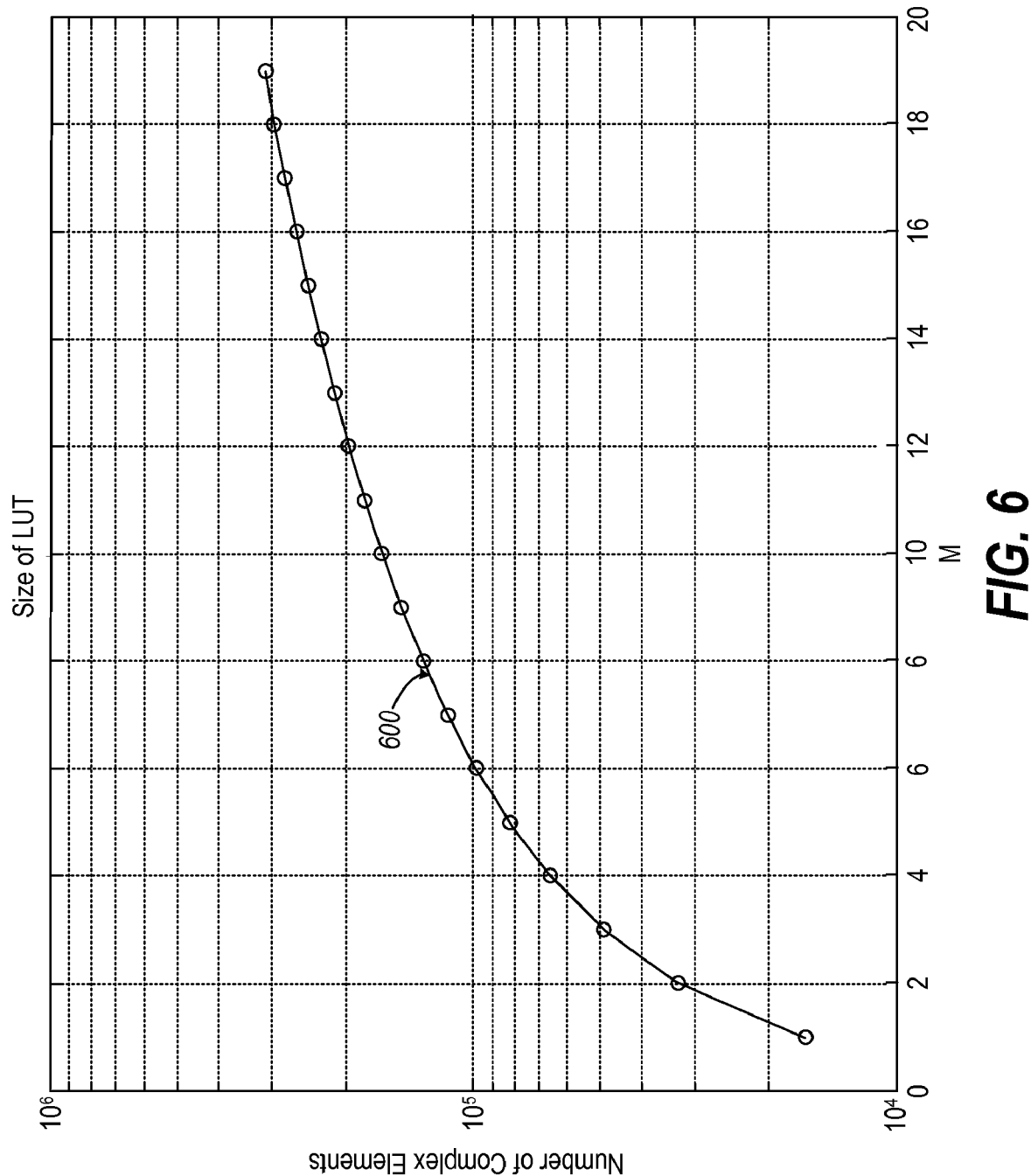
FIG. 6 depicts a graphical plot for size of a lookup table (LUT) as a function of number of groups with a restricted hopping mode.

Considering the impact of restricted hopping, for a given value of {N, cell ID} only a few sequences are allowed with hopping across different allowed values and hopping at slot boundaries. Given the size of allowed set<=M, then the number of allowed sequences for a given N=Nmax: Nmax=min {p(N−1), M}. It should be appreciated that planned mode is a special case of restricted hopping. Conventionally as depicted in FIG. 6 at 600, the size of the Look Up Table (LUT) can be quite large. Thus, the eNB would have to store the allowed complex sequences within a cell. The UE can then store those allowed complex sequences applicable to the serving cell and perhaps those of one or more neighboring cells for efficient handoff.

Observations follow then that the LUT size for planned mode is 16.4K complex samples. For restricted hopping mode with M=3, there are 49.2K complex samples. For M=9, there are 148K complex samples. Thus, unless the number of groups within the restricted hopping mode is extremely small, LUT approach is not quite beneficial. For planned mode, LUT looks attractive for eNB. Depending on active set size, it might be attractive for UE as well.

Alternatively or in addition, generation on the fly can be implemented for a Chu sequence:

$$x(n) = \exp(-j \cdot pi \cdot \Phi(n)) \quad \text{Eqn. 3}$$

$$\Phi(n) = \xi \cdot n \cdot (n+1)/N \quad \text{Eqn. 4}$$

where the phase is recursively determined using the following recursive formula for phase:

$$\Phi(n+1) = \Phi(n) + \xi \cdot 2 \cdot (n+1)/N \quad \text{Eqn. 5}$$

$$\Phi(0) = 0 \quad \text{Eqn. 6}$$

In an exemplary aspect, Sine/cosine LUT can be constructed separately. A hybrid implementation with both LUT and on-time generation can be used. LUT can be used for small values of N (e.g., persistent Voice over IP (VoIP) assignments on physical uplink shared channel (PUSCH), PUCCH, etc.). On-time generation can be used for larger values of N.

In the exemplary implementation, Chu sequence generation is discussed below including aspects of (1) basic Chu sequence setup for the uplink (UL), (2) Recursive Sequence Generation (RSG) hardware architecture, (3) signaled parameters, and (4) calculated parameters.

Figure 7:
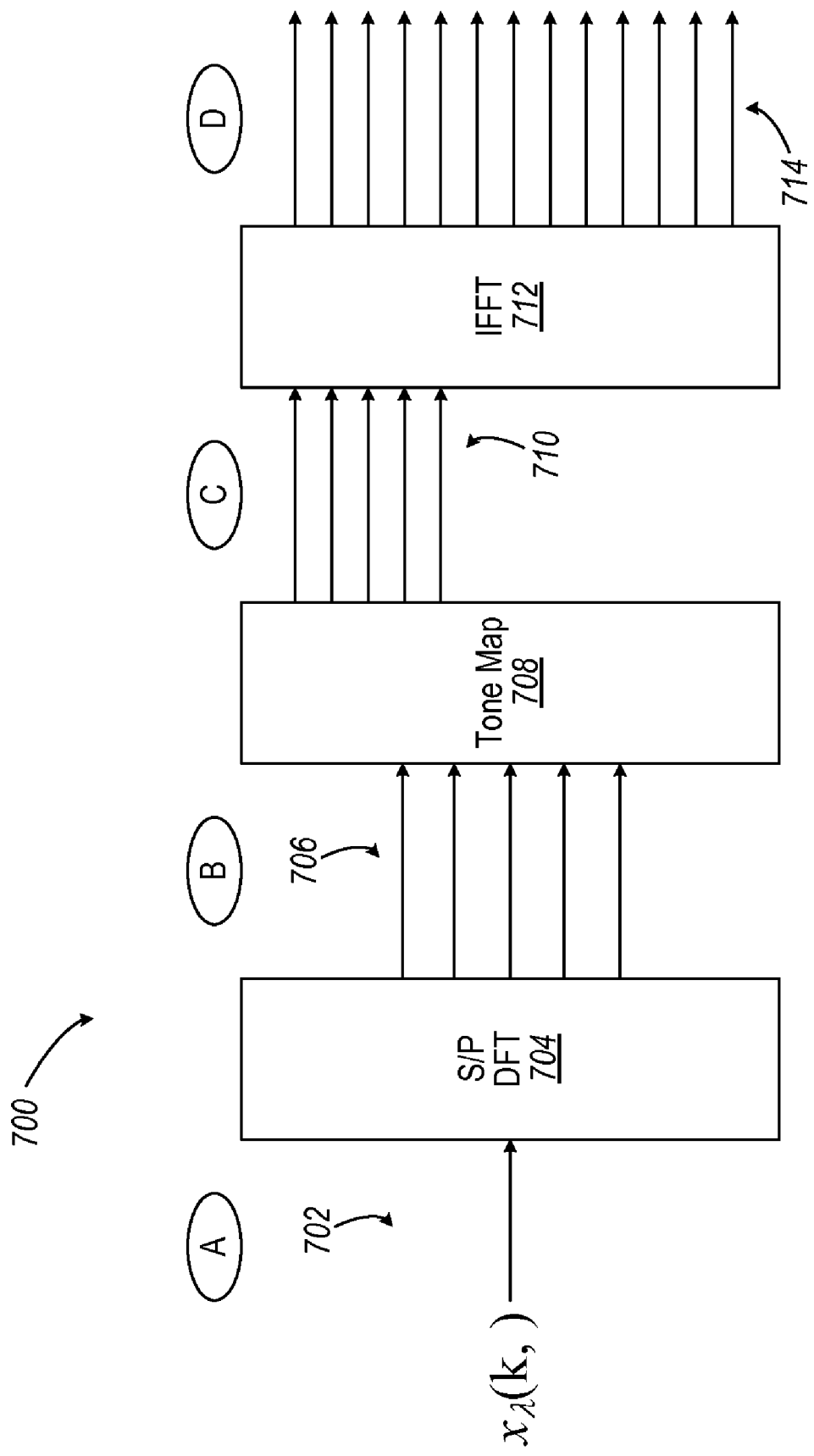
FIG. 7 depicts a block diagram of an uplink Chu sequence generator.

BASIC CHU SEQUENCE SETUP. For clarity, in FIG. 7, emphasis is placed on an UL pilot generator 700, although it should be appreciated that other CHU sequences can be generated in a similar manner. An input signal $x_\lambda(k)$ at input stage "A" at 702 is passed to a signal processor (SP) 704 that is configured to perform as a Discrete Fourier Transform (DFT). Output from SP 704 at stage "B" at 706 passes to a tone map component 708 and is output at stage "C" at 710. In turn, an Inverse Fast Fourier Transform (IFFT) component 712 then produces at stage "D" at 714.

$$x_\lambda(k) = \quad \text{Eqn. 7}$$

$$\begin{cases} e^{-j\pi \cdot (\lambda \cdot (k+(N/2))^2 + 2\omega \cdot k + \phi)/N} & -(N/2) \le k \le (N/2)-1 \quad N = \text{even} \\ e^{-j\pi \cdot \left( \lambda \cdot (k+((N-1)/2)) + (k+((N+1)/2)) + 2\omega \cdot k + \varphi \right)/N} & -(N-1)/2 \le k \le (N-1)/2 \quad N = \text{odd} \end{cases}$$

$$g.c.d.(\lambda, N) = 1 \; \omega, \varphi = 0$$

Recursive Sequence Generation can use the following formula to generate signal x(k) at stage "B" 706:

$$x(k) = LUT\{LSB_{11,x}(\varphi(k))\} \quad \text{Eqn. 8}$$

$$\varphi(k) = \begin{cases} \alpha & k = 0 \\ LSB_{11}\{\varphi(k-1) + \theta(k)\} & 0 < k \le N-1, \end{cases}$$

$$\theta(k) = \begin{cases} \beta & k = 1 \\ LSB_{11}\{\theta(k-1) + \gamma\} & 1 < k \le N-1 \end{cases}$$

where LUT denotes a standard Sin/Cos table, $LSB_{11}$ means keep the 11 LSB bits of the integer part and keep the fractional part, and $LSB_{11,x}$ means keep the 11 LSB bits of the integer part after rounding to the closest integer. In one aspect, required bit-width in recursive accumulator is α: 11 bits;
β: 21 bits;
γ: 32 bits;
Phase accumulator: 21 bits fractional, 32+ bits total.

It should be appreciated that these bit widths are illustrative and that sequences of different bit widths can be implement consistent with aspects disclosed herein.

A list of configuration dependent signaled parameters can comprise:

N': number of occupied tones (@B), always multiple of 12;
F: RB offset (@C), not Chu sequence specific, will be ignored here;
N: Chu sequence modulus (@A and @B), should be a prime, close to N';
λ: the base index (@A), g.c.d.(λ, N)=1, if N is a prime then this condition is automatically satisfied. There could be a set of ~30+ possible λ values specified for each N;
a: time shift value (@D), should be from the set {0, 1, . . . , 11};
Actual signaled parameter can be the parameter value itself or an index pointing to the parameter value within a standard set;

Another parameter (implicit) is the N to N' sequence transformation; need to specify left or right extension/truncation, no signaling is required for this;

The main goal of this presentation to give the internal mapping:

$$\{N,N',\lambda,a\} \rightarrow \{\alpha,\beta,\gamma\} \quad \text{Eqn. 9}$$

In a first aspect for calculated parameters for the Chu sequence generator, assume N odd and $0 \leq k \leq N-1$, instead of $-(N-1)/2 \leq k \leq (N-1)/2$:

$$\gamma = 2048 \cdot ((-1/\lambda) \bmod N)/N, \quad \text{Eqn. 10}$$

where keeps twenty one (21) fractional bits. As an example: $\lambda=3$, $N=11 \rightarrow \gamma=2048 \cdot (11-4)/11=1303.272727\ldots$.

$$\beta = 1024 \cdot ((-1/\lambda) \bmod N)/N + 1024 \cdot m(N,\lambda) + 2048 \cdot a/12, \quad \text{Eqn. 11}$$

where keeps 10 fractional bits, $m(N, \lambda)$ is a stored one bit value mapped to $\{0, 1\}$. As an example: $\lambda=3$, $N=11$, $a=1 \rightarrow \beta=1024 \cdot (11-4)/11 + 1024 \cdot m(N, \lambda) + 2048/12$.

$$\alpha = a(N,\lambda), \quad \text{Eqn. 12}$$

where there is no closed form for this. The values come from a limited set, so indexing is possible. No fractional bits are used, thus value is an integer in the range [0 . . . 2047].

In a second aspect for calculated parameters for the Chu sequence generator, assume N odd and $\_(N-1)/2 \leq k \leq (N-1)/2$ instead of $0 \leq k \leq N-1$:

$$\gamma = 2048 \cdot ((-1/\lambda) \bmod N)/N, \quad \text{Eqn. 13}$$

where keeps twenty one (21) fractional bits. An example is: $\lambda=3$, $N=11 \rightarrow \gamma=2048 \cdot (11-4)/11=1303.272727\ldots$.

$$\beta = 2048 \cdot m(N,\lambda) + 2048 \cdot a/12, \quad \text{Eqn. 14}$$

where keeps ten (10) fractional bits and $m(N, \lambda)$ is calculated as described below.

$$\alpha = \alpha(N,\lambda), \quad \text{Eqn. 15}$$

where the values come from a limited set, so indexing is possible; however closed form solution is given below. An alternative solution is to compute the DC value of the time domain sequence but this is disadvantaged from a complexity perspective. No fractional bits in fixed point α, value is an integer in the range [0 . . . 2047].

Thus, an illustrative number of possible sequences are provided in TABLE 1:

TABLE 1

Sequence Length Case

| Function | Bandwidth (MHz) | Extended Chu Sequence Length |
|---|---|---|
| Uplink | 1.4 | 12*k, k = 1, 2, 3, 4, 5, 6 |
| Transmit | 3.0 | 12*k, k = 1, 2, 3, 4, 5, 6, 8, 9, 10, 12, 15 |
| Input (DFT) | 5.0 | 12*k, k = 1, 2, 3, 4, 5, 6, 8, 9, 10, 12, 15, 16, 18, 20, 24, 25 |
| | 10.0 | 12*k, k = 1, 2, 3, 4, 5, 6, 8, 9, 10, 12, 15, 16, 18, 20, 24, 25, 27, 30, 32, 36, 40, 45, 48, 50 |
| | 15.0 | 12*k, k = 1, 2, 3, 4, 5, 6, 8, 9, 10, 12, 15, 16, 18, 20, 24, 25, 27, 30, 32, 36, 40, 45, 48, 50, 54, 60, 64, 72, 75 |
| | 20.0 | 12*k, k = 1, 2, 3, 4, 5, 6, 8, 9, 10, 12, 15, 16, 18, 20, 24, 25, 27, 30, 32, 36, 40, 45, 48, 50, 54, 60, 64, 72, 75, 80, 81, 90, 96, 100, 108 |

The lower bandwidth (BW) cases are always a subset of higher BW cases, therefore it is sufficient to deal with the 20 MHz option only→35 cases for N. 'For each N', it is expected to have ~9 . . . 12 different λ and 6 . . . 12 different 'a' defined.

With regard to sequence segmentation, consider a useful segmentation property: For N odd, it is sufficient to generate the first $(N+1)/2$ elements, the $(N-1)/2$ elements in the second half are the mirror image:

$$x((N+1)/2+k)=x((N-1)/2-k), 0 \leq k<(N-1)/2. \quad \text{Eqn. 16}$$

For N even, it is sufficient to generate the first N/2 elements, the second half is repeated with alternating sign flip:

$$x(k+N/2)=(-1)^{k+1}x(k), 0 \leq k<N/2, \quad \text{Eqn. 17}$$

with the same principle can be used with N/4, N/8 segmentations when 4 or 8 divides N.

Further segmentation is also possible but the sub-segments would then have to be independently generated. Reduces processing by way of parallelization requires multiple hardware blocks.

With regard to sequence extension/truncation, for PUSCH reference signals, the frequency domain signal is extended or truncated, i.e. $N' \neq N$. In LTE, only extension will be used. Generating a truncated sequence is trivial, the unwanted portion can be discarded, or the sequence generator can be stopped before it generates the unwanted portion. Generating an extended sequence can be accomplished by first generating the Chu sequence for length N and then using memory copy operation to create the cyclic extension. This, however, does not give the desired result whenever the cyclic time shift 'a' is not zero because the factor corresponding to 'a' is not periodic by N', therefore the cyclically wrapped around portion will not be an identical copy.

A simpler apparatus is just to keep clocking the same algorithm described in this presentation past reaching the $N^{th}$ element. This gives the proper extension both from the perspective of the Chu sequence and the cyclic time shift 'a'.

REFERENCE SIGNAL GENERATOR. Reference signals are generated in two ways. The first way used for 1 and 2 resource block allocations as well as PUCCH spreading consists of arbitrary standard defined sequences stored in Random Access Memory (RAM). The second is with Chu sequences which are generated when needed.

Figure 8:
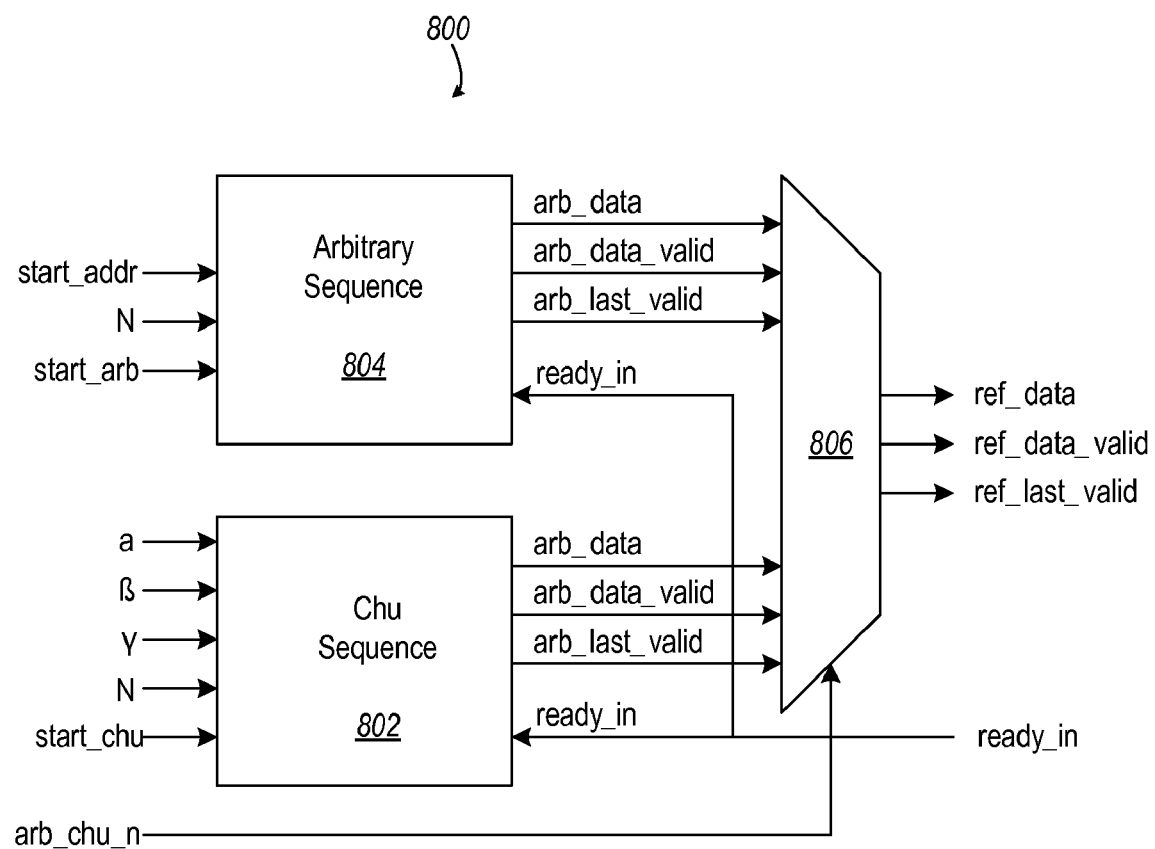
FIG. 8 depicts a block diagram of a reference signal generator that multiplexes together outputs from arbitrary and Chu sequence generators.

In FIG. 8, a reference signal generator 800 generates the post DFT reference signals. This will allow the reference symbol to bypass the DFT engine and the PUCCH signal path to bypass the DFT engine. This will allow the DFT engine clock to be off for power savings. Reference sequence requirements for the reference signal generator 800 in an illustrative implementation can be one sample per clock, sequence is generated in sequential order, can be stalled by downstream block, programmable arbitrary sequences, and mode to alternate reference symbols with 0 for Sounding Reference Signal.

With regard to reference signal generator signals, the following TABLE 2 shows the reference signal generator IO ports.

TABLE 2

| Signal | Dir | Connection | Comments |
|---|---|---|---|
| clk | IN | clock | 100 MHz system clock. |
| reset | IN | clock | system reset |
| mrif_addr | IN | ahb2mrif | address for modem bus access |
| mrif_avalid | IN | ahb2mrif | address valid signal |
| mrif_wr | IN | ahb2mrif | write strobe |
| mrif_wbe_n[3:0] | IN | ahb2mrif | byte write enables |
| mrif_wdata3[1:0] | IN | ahb2mrif | write data |
| mrif_rdata | OUT | ahb2mrif | read data. This should be anded with decoded address so read data from other |

TABLE 2-continued

| Signal | Dir | Connection | Comments |
| --- | --- | --- | --- |
| | | | blocks can be ored together at mrif port. |
| mrif_ready | OUT | ahb2mrif | read ready signal |
| mrif_rvalid | OUT | ahb2mrif | read valid signal |
| star_addr[N:0] | IN | task parser | start address for sequence |
| start_arb | IN | task parser | start strobe for arbitrary sequence generator |
| alpha[10:0] | IN | task parser | chu parameter |
| beta[20:0] | IN | task parser | chu parameter |
| lambda[31:0] | IN | task parser | chu parameter |
| N[9:0] | IN | task parser | sequence length |
| start_chu | IN | task parser | start strobe for Chu sequence generator |
| arb_chu_n | IN | task parser | 0: arbitrary sequence 1: Chu sequence |
| srs_ref | IN | task parser | 0: reference sequence 1: SRS sequence |
| even_odd | IN | task parser | 0: odd samples zero 1: even samples zero |
| arb_data[N:0] | OUT | various | sample data |
| arb_data_valid | OUT | various | data valid strobe |
| ready_in | IN | various | signal to hold off output of data |
| arb_last_valid | OUT | various | signals end of sequence |

TABLE 3

| Signal | Dir | Connection | Comments |
| --- | --- | --- | --- |
| clk | IN | clock | 100 MHz system clock. |
| reset | IN | clock | system reset |
| alpha[10:0] | IN | task parser | chu parameter |
| beta[20:0] | IN | task parser | chu parameter |
| lambda[31:0] | IN | task parser | chu parameter |
| conjugate | IN | task parser | 0 normal output 1 complex conjugate output |
| N[9:0] | IN | task parser | sequence length |
| start | IN | task parser | Start strobe. |
| I[13:0] | OUT | various | I data value |
| Q[13:0] | OUT | various | Q data value |
| data_valid | OUT | various | data valid strobe |
| ready_in | IN | various | signal to hold off output of data |
| last_valid | OUT | various | signals end of sequence |

Figure 9:
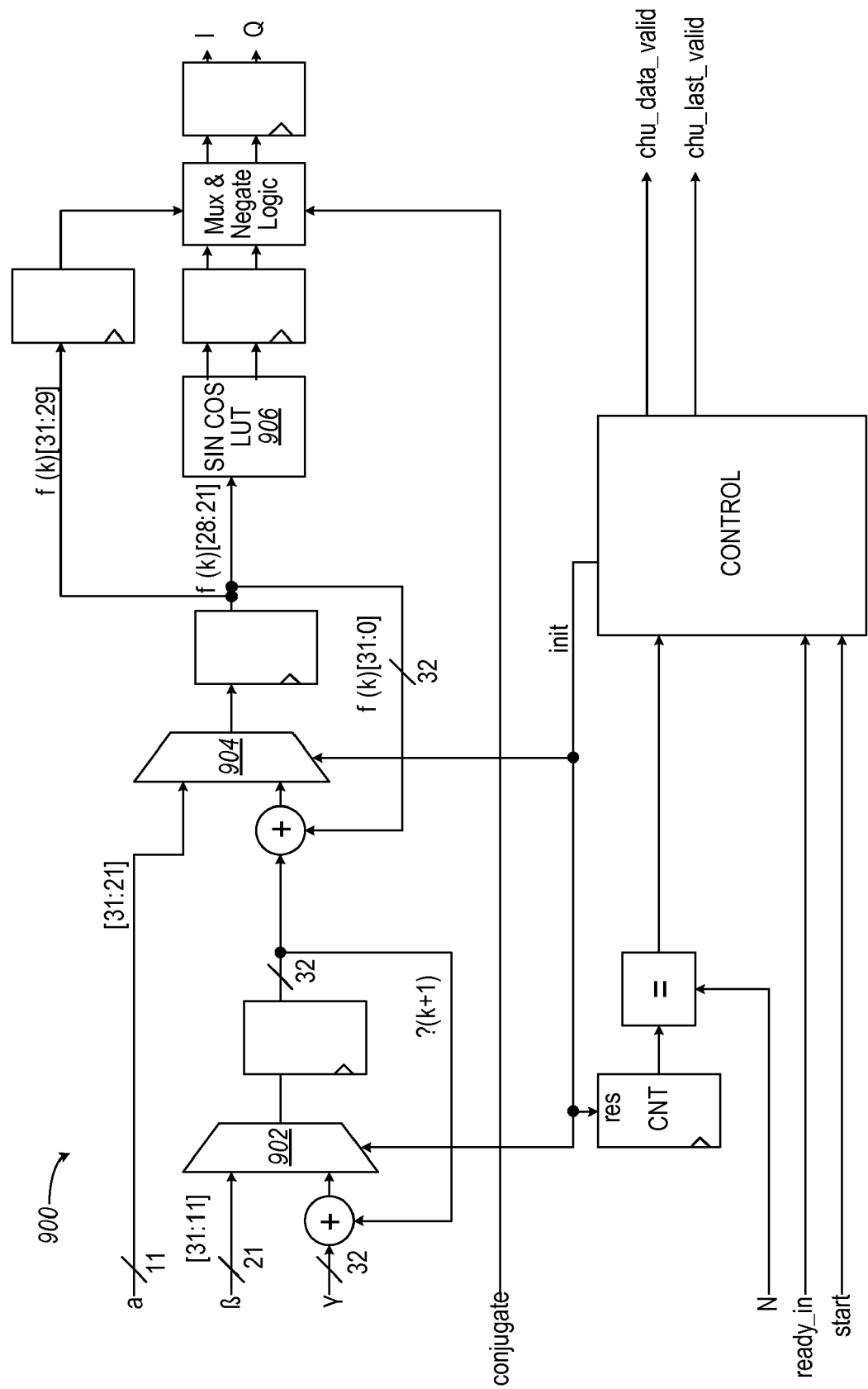
FIG. 9 depicts a block diagram of an arbitrary sequence generator for the reference signal generator of FIG. 8.

With reference to FIG. 9, an illustrative Chu sequence generator 900 consists of two 32-bit accumulators 902, 904 and a phase-to-rectangular converter 906. When the start signal is received, the multiplexers ("muxes") in the accumulators 902, 904 are set so that alpha and beta are loaded into the registers and a counter is reset to zero. Each subsequent clock cycle will generate a new theta.

The phase to rectangular converter 906 is implemented as a ⅛ circle sine cosine LUT with 256 entries. Three upper bits of the phase are used to decide if I or Q gets plus or minus sin or plus or minus cosine. The downstream user of the Chu sequence has the ability with the ready_in signal to stall the sequence generator at any time.

Arbitrary sequences can be around 60 sequences, thirty (30) for PUCCH and one resource block (RB) assignments and thirty (30) for two resource block assignments. The PUCCH and one resource block assignments can have twelve (12) entries per sequence. Then two resource block sequences can have twenty four (24) entries per sequence. Requirements for arbitrary sequence generation can comprise one sample per clock, sequence is output in sequential order, and cyclic shift can be applied, can be stalled by downstream block, and can be programmable arbitrary sequences.

Illustrative arbitrary sequence signals depicted for the input/output (IO) ports of the arbitrary sequence generator 804 (FIG. 8) are depicted in TABLE 4:

In FIG. 8, a reference signal generator 800 outputs from a Chu sequence generator 802 and an arbitrary sequence generator 804 are multiplexed at a multiplexer 806.

In FIG. 9, an exemplary Chu sequence generator 900 is depicted. Chu sequences are used as the reference signal for PUSCH. The elements in a Chu sequence are complex samples of magnitude "1" with an increasing phase difference between consecutive elements. This can be implemented as two accumulators 902, 904 and a sine cosine LUT 906. The DFT of a Chu sequence results in another sequence. The UE TX hardware can exploit this property to allow for the symbols using Chu sequences to bypass the DFT path in the TX data path.

There are four parameters for the Chu sequence generator. The values for these will come from a systems team look up table converting the pre DFT parameters into post DFT parameters. These LUTs can be implemented in DSP software.

The Chu sequence generator can comply with requirements such as one sample per clock, sequence is generated in sequential order, and normal or complex conjugate output (e.g., software programmable).

With regard to the Chu sequence signals, the following TABLE 3 shows the UE Chu generator IO ports.

TABLE 4

| Signal | Dir | Connection | Comments |
| --- | --- | --- | --- |
| clk | IN | clock | 100 MHz system clock. |
| reset | IN | clock | system reset |
| mrif_addr | IN | ahb2mrif | address for modem bus access |
| mrif_avalid | IN | ahb2mrif | address valid signal |
| mrif_wr | IN | ahb2mrif | write strobe |
| mrif_wbe_n[3:0] | IN | ahb2mrif | byte write enables |
| mrif_wdata[31:0] | IN | ahb2mrif | write data |
| mrif_rdata | OUT | ahb2mrif | read data. This should be anded with decoded address so read data from other blocks can be ored together at mrif port. |
| mrif_ready | OUT | ahb2mrif | read ready signal |
| mrif_rvalid | OUT | ahb2mrif | read valid signal |
| star_addr[N:0] | IN | task parser | start address for sequence |
| start | IN | task parser | start strobe |
| N | IN | task parser | length of sequence |
| ready_in | IN | IFFT | ready for next sample in sequence |
| arb_data[N:0] | OUT | IFFT | sample data |
| arb_data_valid | OUT | IFFT | data valid |
| arb_last_valid | OUT | IFFT | last sample pulse |

Figure 10:
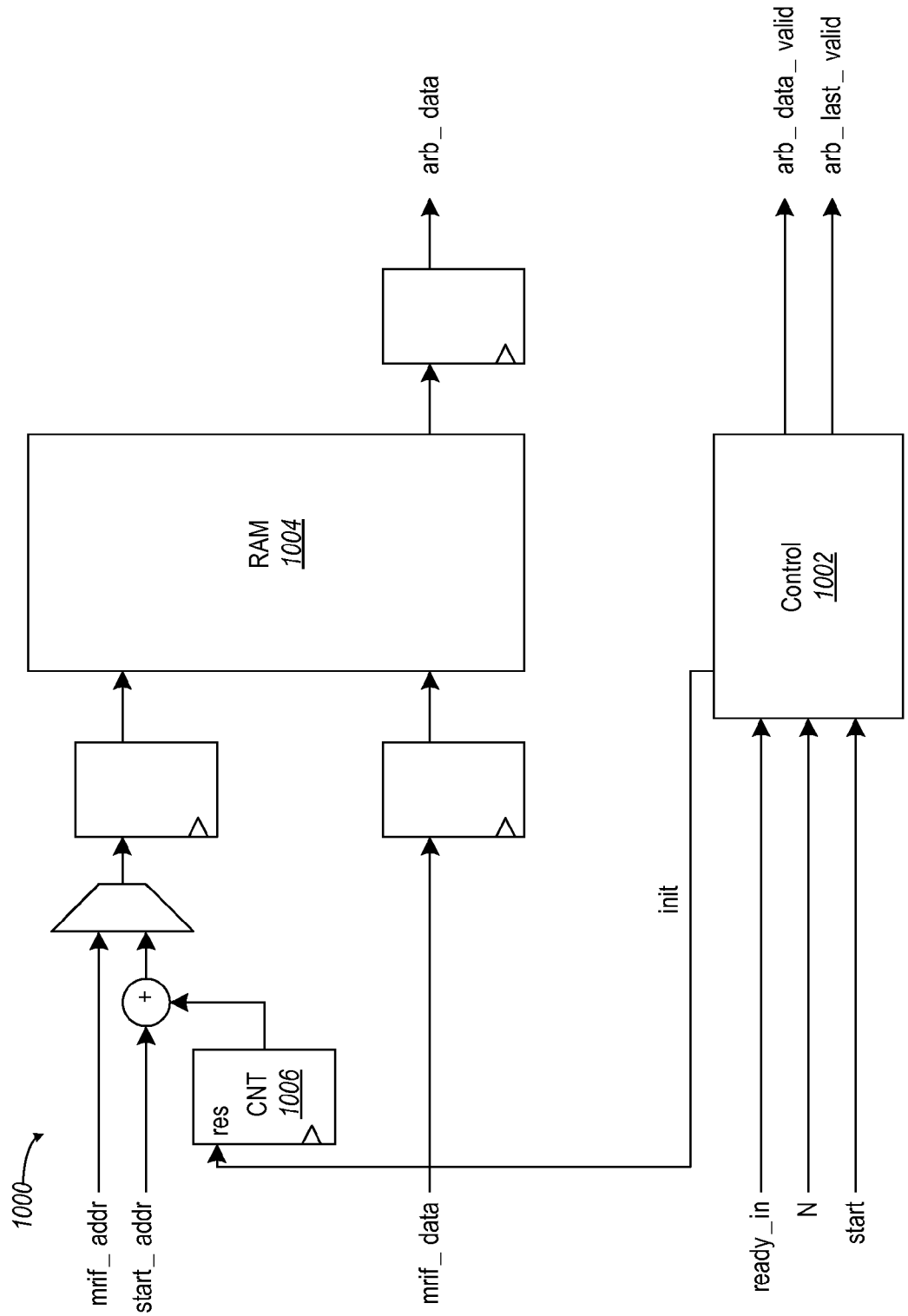
FIG. 10 depicts a block diagram for a recursive sequence generator.

With reference to FIG. 10, in an exemplary implementation of an arbitrary sequence generator 1000, all the sequences can be stored in memory. A DSP, depicted as control 1002 initializes a memory, depicted as Random Access Memory (RAM) 1004 prior to starting transmission. The sequences are stored consecutively in the memory 1004. The tasks contain a starting address for the sequence to be used. A counter 1006 tracks which element in the sequence is being generated. The output of the counter 1006 is added to the starting address to generate an address to the sequence memory address to get the sample value. The values stored in memory 1004 post Fast Fourier Transform (FFT) values so that the PUCCH and reference symbols do not need to go through the FFT generator.

An illustrative implementation can provide for sounding reference signal generation. The sounding reference signal (SRS) occupies one OFDM symbol during PUSCH or PUCCH transmission subframe. The eNode-B signals to the UE if it wants a sounding reference transmission. The SRS consists of alternating samples from the reference sequence as described above and 0. The top level of the reference generator will insert the 0 samples into the sequence when the sounding reference is called for.

The PUSCH modulation task and PUCCH tasks have the following SRS parameters.

enabled (1: sounding reference enabled, 0: sounding reference disabled);

even (1: sequence on even tones, 0: sequence on odd tones);

symbol (sounding reference transmitted on symbol 0 to 13 of subframe);

CHU SEQUENCE TIME-FREQUENCY DUALITY. To further describe calculations for initializing the generator hardware described above, the Zadoff-Chu sequence of length N is defined as:

$$X(k) = \begin{cases} \exp\left\{-j\frac{2\pi\gamma}{N}\left(\frac{1}{2}k^2 + qk\right)\right\}, & \text{even } N \\ \exp\left\{-j\frac{2\pi\gamma}{N}\left(\frac{1}{2}k(k+1) + qk\right)\right\}, & \text{odd } N \end{cases} \quad \text{Eqn. 18}$$

where $\gamma$, co-prime to N, is called the Chu base index. There is a secondary frequency ramping which is governed by the parameter q. One can show a "duality": The DFT (or IDFT) of a Chu sequence with base index $\gamma$ is another Chu sequence with base index $\delta$, with $\gamma\delta \equiv -1 \mod N$ Note that the duality mapping is unique, for $\gamma$ and/or $\delta$ are co-prime to N.

Main Results—The IDFT Theorem (Frequency to Time Translation). Without loss of generality, we assume the frequency-domain Chu sequence X(k) with q=0. More specifically, $$X(k) = \begin{cases} \exp\left\{-j\frac{2\pi\gamma}{N}\frac{1}{2}k^2\right\}, & \text{even } N \\ \exp\left\{-j\frac{2\pi\gamma}{N}\frac{1}{2}k(k+1)\right\}, & \text{odd } N \end{cases} \quad \text{Eqn. 19}$$

The time-domain sequence, x(n), after IDFT is given by $$x(n) = \sum_{k=0}^{N-1} X(k)\exp\left\{j\frac{2\pi}{N}nk\right\}, \quad \text{Eqn. 20}$$

$n = 0, \ldots, N-1.$

For a given base index $\gamma$, define $\gamma'$ as the unique solution in $Z_N$ of $\gamma\gamma' \equiv 1 \mod N$, and similarly, $\gamma''$ of $\gamma\gamma'' \equiv 1 \mod N$.

(In fact, $\gamma'' = N - \gamma'$.)

Then $$x(n) = \qquad \text{Eqn. 21}$$

$$\begin{cases} C_N(\gamma)\exp\left\{-j\frac{2\pi\gamma''}{N}\left(\frac{1}{2}n^2 - \frac{1}{2}\gamma(\gamma\gamma'' + 1)n\right)\right\}, & \text{even } N \\ C_N(\gamma)\exp\left\{-j\frac{2\pi\gamma''}{N}\left(\frac{1}{2}n(n+1) - \frac{1}{2}\gamma^2\gamma'(\gamma' + 1)n\right)\right\}, & \text{odd } N \end{cases}$$

The constant term $C_N(\gamma)$ is given by $$C_N(\gamma) = \begin{cases} \sum_{k=0}^{N-1} \exp\left\{-j\frac{2\pi\gamma}{N}\frac{1}{2}k^2\right\}, & \text{even } N \\ \sum_{k=0}^{N-1} \exp\left\{-j\frac{2\pi\gamma}{N}\frac{1}{2}k(k+1)\right\}, & \text{odd } N \end{cases} \quad \text{Eqn. 22}$$

Moreover, the modulus of $C_N(\gamma)$ is constant regardless of the base index and $|C_N(\gamma)| = \sqrt{N}$, which can be shown by comparing the energy of x(n) and X(k).

The DFT Theorem (Time to Frequency Translation). Without loss of generality, we assume the time-domain Chu sequence x(n) with q=0. More specifically, $$x(n) = \begin{cases} \exp\left\{-j\frac{2\pi\gamma}{N}\frac{1}{2}n^2\right\}, & \text{even } N \\ \exp\left\{-j\frac{2\pi\gamma}{N}\frac{1}{2}n(n+1)\right\}, & \text{odd } N \end{cases} \quad \text{Eqn. 23}$$

The frequency-domain sequence, X(k), after DFT, $$X(k) = \sum_{n=0}^{N-1} x(n)\exp\left\{-j\frac{2\pi}{N}nk\right\}, \quad \text{Eqn. 24}$$

$k = 0, \ldots, N-1.$ is also a Chu sequence $$X(k) = \qquad \text{Eqn. 25}$$

$$\begin{cases} C_N(\gamma)\exp\left\{-j\frac{2\pi\gamma''}{N}\left(\frac{1}{2}k^2 - \frac{1}{2}\gamma(\gamma\gamma'' + 1)k\right)\right\}, & \text{even } N \\ C_N(\gamma)\exp\left\{-j\frac{2\pi\gamma''}{N}\left(\frac{1}{2}k(k+1) - \frac{1}{2}\gamma^2\gamma'(\gamma' - 1)k\right)\right\}, & \text{odd } N \end{cases}$$

PROOF. We will only derive the IDFT theorem. The co-prime condition $\gcd(\gamma, N)=1$ is a key to our proof. There exist a $\gamma'$ in $Z_N$ and an integer "a" such that $\gamma\gamma' = aN + 1.$ \hfill Eqn. 26

Note that $\gamma\gamma' \equiv 1 \bmod N$ and $$\frac{1}{r} = \frac{1}{aN+1}\gamma' = \left(1 - \frac{aN}{aN+1}\right)\gamma' = \gamma' - \frac{aN}{aN+1}\gamma'. \quad \text{Eqn. 27}$$

Let $\gamma\gamma'' \equiv -1 \bmod N$. Substituting $(\gamma\gamma')^2 \equiv 1 \bmod N$, one has $\gamma\gamma'' \equiv -\gamma^2\gamma'^2$, and thus
$-\gamma\gamma'^2 \equiv \gamma'' \bmod N$.

Even N:

$$x(n) = \sum_{k=0}^{N-1} X(k)\exp\left\{j\frac{2\pi}{N}nk\right\} \quad \text{Eqn. 28}$$

$$= \sum_{k=0}^{N-1} \exp\left\{-j\frac{2\pi\gamma}{N}\left(\frac{1}{2}k^2 - \frac{nk}{\gamma}\right)\right\}$$

$$= \sum_{k=0}^{N-1} \exp\left\{-j\frac{2\pi\gamma}{N}\left(\frac{1}{2}k^2 - \frac{1}{aN+1}\gamma'nk\right)\right\}$$

$$= \sum_{k=0}^{N-1} \exp\left\{-j\frac{2\pi\gamma}{N}\left(\frac{1}{2}k^2 - \left(1 - \frac{aN}{aN+1}\right)\gamma'nk\right)\right\}$$

$$= \sum_{k=0}^{N-1} \exp\left\{-j\frac{2\pi\gamma}{N}\left(\frac{1}{2}k^2 - \gamma'nk\right)\right\}$$

$$\exp\left\{-j\frac{2\pi}{N}\frac{aN}{aN+1}\gamma\gamma'nk\right\}$$

$$= \sum_{k=0}^{N-1} \exp\left\{-j\frac{2\pi\gamma}{N}\left(\frac{1}{2}k^2 - \gamma'nk\right)\right\},$$

(since $\gamma\gamma' = aN + 1$)

$$= \sum_{k=0}^{N-1} \exp\left\{-j\frac{2\pi\gamma}{N}\left(\frac{1}{2}(k-\gamma'n)^2 - \frac{1}{2}\gamma'^2 n^2\right)\right\},$$

(completing the square)

$$= \left(\sum_{k=0}^{N-1} \exp\left\{-j\frac{2\pi\gamma}{N}\frac{1}{2}(k-\gamma'n)^2\right\}\right)$$

$$\exp\left\{-j\frac{2\pi(-\gamma\gamma'^2)}{N}\frac{1}{2}n^2\right\}$$

Let $k' = k - \gamma'n$, one has $$\sum_{k=0}^{N-1} \exp\left\{-j\frac{2\pi\gamma}{N}\frac{1}{2}(k-\gamma'n)^2\right\} = \quad \text{Eqn. 29}$$

$$\sum_{k'=-\gamma'n}^{N-1-\gamma'n} \exp\left\{-j\frac{2\pi\gamma}{N}\frac{1}{2}k'^2\right\} = \sum_{k'=0}^{N-1} \exp\left\{-j\frac{2\pi\gamma}{N}\frac{1}{2}k'^2\right\},$$

$$\left(\text{since } \exp\left\{-j\frac{2\pi\gamma}{N}\frac{1}{2}k^2\right\} \text{is periodic in}\right.$$

$$\left. k \text{ with period } N \text{ for even } N.\right) = C_N(\gamma)$$

Hence, one has $$x(n) = C_N(\gamma)\exp\left\{-j\frac{2\pi(-\gamma\gamma'^2)}{N}\frac{1}{2}n^2\right\}.$$

Since $-\gamma\gamma'^2 \equiv \gamma'' \bmod N$, there exists an integer b such that $-\gamma\gamma'^2 = bN + \gamma''$. So $$x(n) = C_N(\gamma)\exp\left\{-j\frac{2\pi\gamma''}{N}\frac{1}{2}n^2\right\}\exp\{-j\pi bn^2\}$$

$$= C_N(\gamma)\exp\left\{-j\frac{2\pi\gamma''}{N}\frac{1}{2}n^2\right\}\exp\{-j\pi bn\},$$

(since n and $n^2$ have the same parity, i.e., both even or odd.)
Eqn. 30

Since $\gamma\gamma'' \equiv 1 \bmod N$, one can write $\gamma\gamma'' = cN - 1$. We claim the integers "b" and "c" have the same parity. To see this, multiply both sides of $-\gamma\gamma'^2 = bN + \gamma''$ by $\gamma$, and use $\gamma\gamma' = aN + 1$. One has $$-(aN+1)^2 = bN\gamma + cN - 1 \Rightarrow -a^2N - 2a = b\gamma + c.$$

Since N is even and is co-prime to $\gamma$, $\gamma$ must be odd. Therefore, $b\gamma$ and b have the same parity, and b+c must be even which shows b and c have the same parity.

Thus, one has $$x(n) = C_N(\gamma)\exp\left\{-j\frac{2\pi\gamma''}{N}\frac{1}{2}n^2\right\}\exp\{-jcn\pi\}.$$

It is interesting to see that depending on the parity of "c", the time-domain sequence may have $\{1, -1, 1, -1, \ldots\}$ alternating phase ramping. Next, we characterize such a frequency ramping parameter.

$$x(n) = C_N(\gamma)\exp\left\{-j\frac{2\pi\gamma''}{N}\frac{1}{2}n^2\right\}\exp\{-jcn\pi\} \quad \text{Eqn. 31}$$

$$= C_N(\gamma)\exp\left\{-j\frac{2\pi\gamma''}{N}\frac{1}{2}n^2\right\}\exp\left\{-j\frac{2\pi}{N}\frac{cN}{2}n\right\}$$

$$= C_N(\gamma)\exp\left\{-j\frac{2\pi}{N}\left(\frac{1}{2}\gamma''n^2 + \frac{cN}{2}n\right)\right\},$$

(using N even, and $\gamma\gamma'' \equiv -1 \bmod N$, to get the following)

$$= C_N(\gamma)\exp\left\{-j\frac{2\pi}{N}\left(\frac{1}{2}\gamma''n^2 - \frac{1}{2}\gamma\gamma''cNn\right)\right\}$$

$$= C_N(\gamma)\exp\left\{-j\frac{2\pi\gamma''}{N}\left(\frac{1}{2}n^2 - \frac{1}{2}\gamma cNn\right)\right\}$$

$$= C_N(\gamma)\exp\left\{-j\frac{2\pi\gamma''}{N}\left(\frac{1}{2}n^2 - \frac{1}{2}\gamma(\gamma\gamma''+1)n\right)\right\},$$

(using $cN = \gamma\gamma'' + 1$)

Odd N:

$$x(n) = \sum_{k=0}^{N-1} X(k)\exp\left\{j\frac{2\pi}{N}nk\right\} \quad \text{Eqn. 32}$$

$$= \sum_{k=0}^{N-1} \exp\left\{-j\frac{2\pi\gamma}{N}\left(\frac{1}{2}k(k+1) - \frac{nk}{\gamma}\right)\right\}$$

$$= \sum_{k=0}^{N-1} \exp\left\{-j\frac{2\pi\gamma}{N}\left(\frac{1}{2}k(k+1) - \frac{1}{aN+1}\gamma'nk\right)\right\}$$

$$= \sum_{k=0}^{N-1} \exp\left\{-j\frac{2\pi\gamma}{N}\left(\frac{1}{2}k(k+1) - \left(1 - \frac{aN}{aN+1}\right)\gamma'nk\right)\right\}$$

-continued $$= \sum_{k=0}^{N-1} \exp\left\{-j\frac{2\pi\gamma}{N}\left(\frac{1}{2}k(k+1) - \gamma'nk\right)\right\}$$

$$\exp\left\{-j\frac{2\pi}{N}\frac{aN}{aN+1}\gamma\gamma'nk\right\}$$

$$= \sum_{k=0}^{N-1} \exp\left\{-j\frac{2\pi\gamma}{N}\left(\frac{1}{2}k(k+1) - \gamma'nk\right)\right\},$$

(since $\gamma\gamma' = aN + 1$)

$$= \sum_{k=0}^{N-1} \exp\left\{-j\frac{2\pi\gamma}{N}\left(\frac{1}{2}(k - \gamma'n)(k - \gamma'n + 1) + \frac{1}{2}(2k+1)\gamma'n - \frac{1}{2}\gamma'^2n^2 - \gamma'nk\right)\right\}$$

$$= \left(\sum_{k=0}^{N-1} \exp\left\{-j\frac{2\pi\gamma}{N}\frac{1}{2}(k - \gamma'n)(k - \gamma'n + 1)\right\}\right)$$

$$\exp\left\{-j\frac{2\pi\gamma}{N}\left(\frac{1}{2}\gamma'^2n^2 + \frac{1}{2}\gamma'n\right)\right\}$$

Similar to the case of even N, the first term equals to $C_N(\gamma)$, and hence $$x(n) = C_N(\gamma)\exp\left\{-j\frac{2\pi}{N}\left((-\gamma\gamma'^2)\frac{1}{2}n^2 + \frac{1}{2}\gamma\gamma'n\right)\right\} \quad \text{Eqn. 33}$$

$$= C_N(\gamma)\exp\left\{-j\frac{2\pi}{N}\left((-\gamma\gamma'^2)\frac{1}{2}n(n+1) + \frac{1}{2}\gamma\gamma'^2n + \frac{1}{2}\gamma\gamma'n\right)\right\}$$

$$= C_N(\gamma)\exp\left\{-j\frac{2\pi}{N}\left((-\gamma\gamma'^2)\frac{1}{2}n(n+1) + \frac{1}{2}\gamma\gamma'(\gamma' + 1)n\right)\right\}$$

$$= C_N(\gamma)\exp\left\{-j\frac{2\pi}{N}\left((-\gamma\gamma'^2)\frac{1}{2}n(n+1) + \frac{1}{2}\gamma^3\gamma'^3(\gamma' + 1)n\right)\right\},$$

using $\gamma'(\gamma' + 1)$ even and $\gamma\gamma' \equiv 1$ $$= C_N(\gamma)\exp\left\{-j\frac{2\pi(-\gamma\gamma'^2)}{N}\left(\frac{1}{2}n(n+1) - \frac{1}{2}\gamma^2\gamma'(\gamma' + 1)n\right)\right\},$$

$(n(n+1)$ and $\gamma'(\gamma' + 1)$ even)

$$= C_N(\gamma)\exp\left\{-j\frac{2\pi\gamma''}{N}\left(\frac{1}{2}n(n+1) - \frac{1}{2}\gamma^2\gamma'(\gamma' + 1)n\right)\right\},$$

(since $-\gamma\gamma'^2 \equiv \gamma''$.)

COMPUTER SIMULATIONS. We verify the above analytical results via computer simulations.

N=64: The index mapping table ($\gamma \leftrightarrow \delta(\gamma'')$) for N=64 is given in TABLE 5 by

TABLE 5

| $\gamma$ | 1 | 3 | 5 | 7 | 9 | 11 | 13 | 15 | 17 | 19 | 21 | 23 | 25 | 27 |
|---|---|---|---|---|---|---|---|---|---|---|---|---|---|---|
| $\gamma''$ | 63 | 21 | 51 | 9 | 7 | 29 | 59 | 17 | 15 | 37 | 3 | 25 | 23 | 45 |
| $\gamma'$ | 1 | 43 | 13 | 55 | 57 | 35 | 5 | 47 | 49 | 27 | 61 | 39 | 41 | 19 |
| $\gamma$ | 29 | 31 | 33 | 35 | 37 | 39 | 41 | 43 | 45 | 47 | 49 | 51 | 53 | 55 |
| $\gamma''$ | 11 | 33 | 31 | 53 | 19 | 41 | 39 | 61 | 27 | 49 | 47 | 5 | 35 | 57 |
| $\gamma'$ | 53 | 31 | 33 | 11 | 45 | 23 | 25 | 3 | 37 | 15 | 17 | 59 | 29 | 7 |
| $\gamma$ | | | | | | | | | | | | 57 | 59 | 61 | 63 |
| $\gamma''$ | | | | | | | | | | | | 55 | 13 | 43 | 1 |
| $\gamma'$ | | | | | | | | | | | | 9 | 51 | 21 | 63 |

Figure 11:
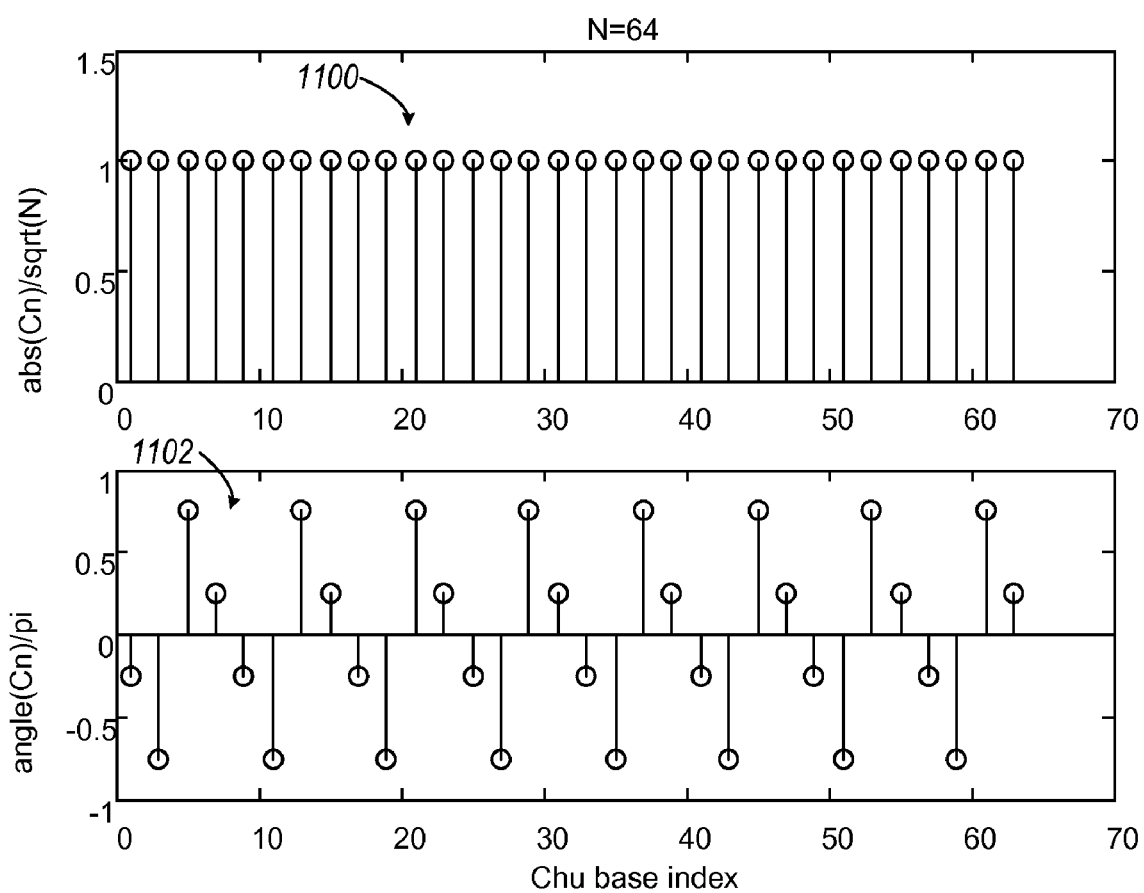
FIG. 11 depicts a graphical plot for an absolute value of a constant value $C_N(\gamma)$ having phase varying with base index for N=64.

In FIG. 11, the absolute value of $C_N(\gamma)$ for N=64 is depicted as constant (equals to $\sqrt{N}$) at 1100 and its phase varies with base index as depicted at 1102.

Figure 12:
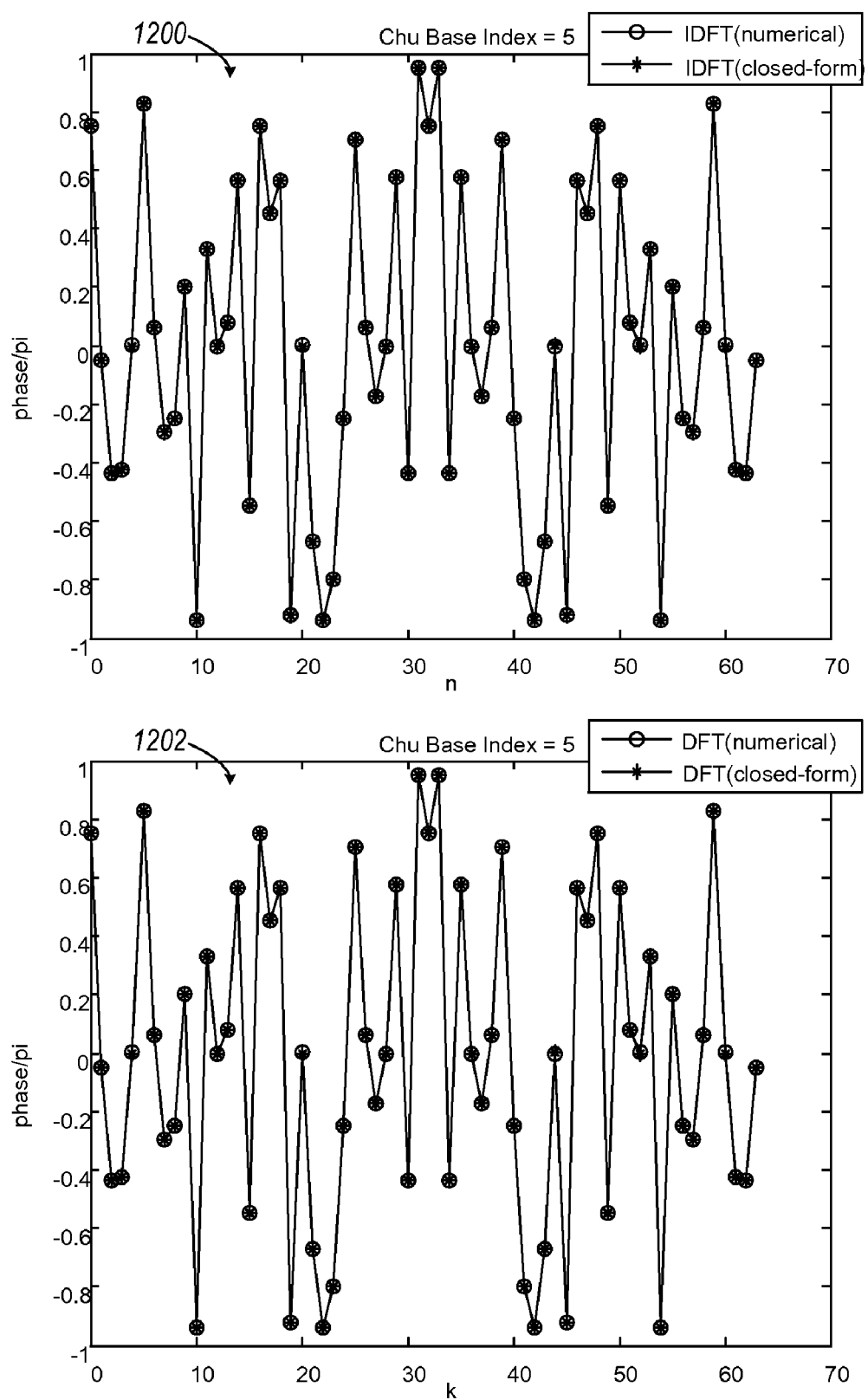
FIG. 12 depicts a graphical plots of numerical versus closed-form calculation of inverse discrete Fourier Transform (IDFT)/discrete Fourier transform (DFT) of Chu sequence of length N=64.

In FIG. 12, a plot numerical vs. closed-form calculation of IDFT depicted at 1200 and of DFT depicted at 1202 of Chu Sequence (N=64) is depicted.

N=71: The index mapping table ($\gamma \leftrightarrow \delta(\gamma'')$) for N=71 in TABLE 6 is given by

TABLE 6

| $\gamma$ | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $\gamma''$ | 70 | 35 | 47 | 53 | 14 | 59 | 10 | 62 | 63 | 7 | 58 | 65 | 60 | 5 |
| $\gamma'$ | 1 | 36 | 24 | 18 | 57 | 12 | 61 | 9 | 8 | 64 | 13 | 6 | 11 | 66 |
| $\gamma$ | 15 | 16 | 17 | 18 | 19 | 20 | 21 | 22 | 23 | 24 | 25 | 26 | 27 | 28 |
| $\gamma''$ | 52 | 31 | 25 | 67 | 56 | 39 | 27 | 29 | 37 | 68 | 17 | 30 | 21 | 38 |
| $\gamma'$ | 19 | 40 | 46 | 4 | 15 | 32 | 44 | 42 | 34 | 3 | 54 | 41 | 50 | 33 |
| $\gamma$ | 29 | 30 | 31 | 32 | 33 | 34 | 35 | 36 | 37 | 38 | 39 | 40 | 41 | 42 |
| $\gamma''$ | 22 | 26 | 16 | 51 | 43 | 48 | 2 | 69 | 23 | 28 | 20 | 55 | 45 | 49 |
| $\gamma'$ | 49 | 45 | 55 | 20 | 28 | 23 | 69 | 2 | 48 | 43 | 51 | 16 | 26 | 22 |
| $\gamma$ | 43 | 44 | 45 | 46 | 47 | 48 | 49 | 50 | 51 | 52 | 53 | 54 | 55 | 56 |
| $\gamma''$ | 33 | 50 | 41 | 54 | 3 | 34 | 42 | 44 | 32 | 15 | 4 | 46 | 40 | 19 |
| $\gamma'$ | 38 | 21 | 30 | 17 | 68 | 37 | 29 | 27 | 39 | 56 | 67 | 25 | 31 | 52 |
| $\gamma$ | 57 | 58 | 59 | 60 | 61 | 62 | 63 | 64 | 65 | 66 | 67 | 68 | 69 | 70 |
| $\gamma''$ | 66 | 11 | 6 | 13 | 64 | 8 | 9 | 61 | 12 | 57 | 18 | 24 | 36 | 1 |
| $\gamma'$ | 5 | 60 | 65 | 58 | 7 | 63 | 62 | 10 | 59 | 14 | 53 | 47 | 35 | 70 |

Figure 13:
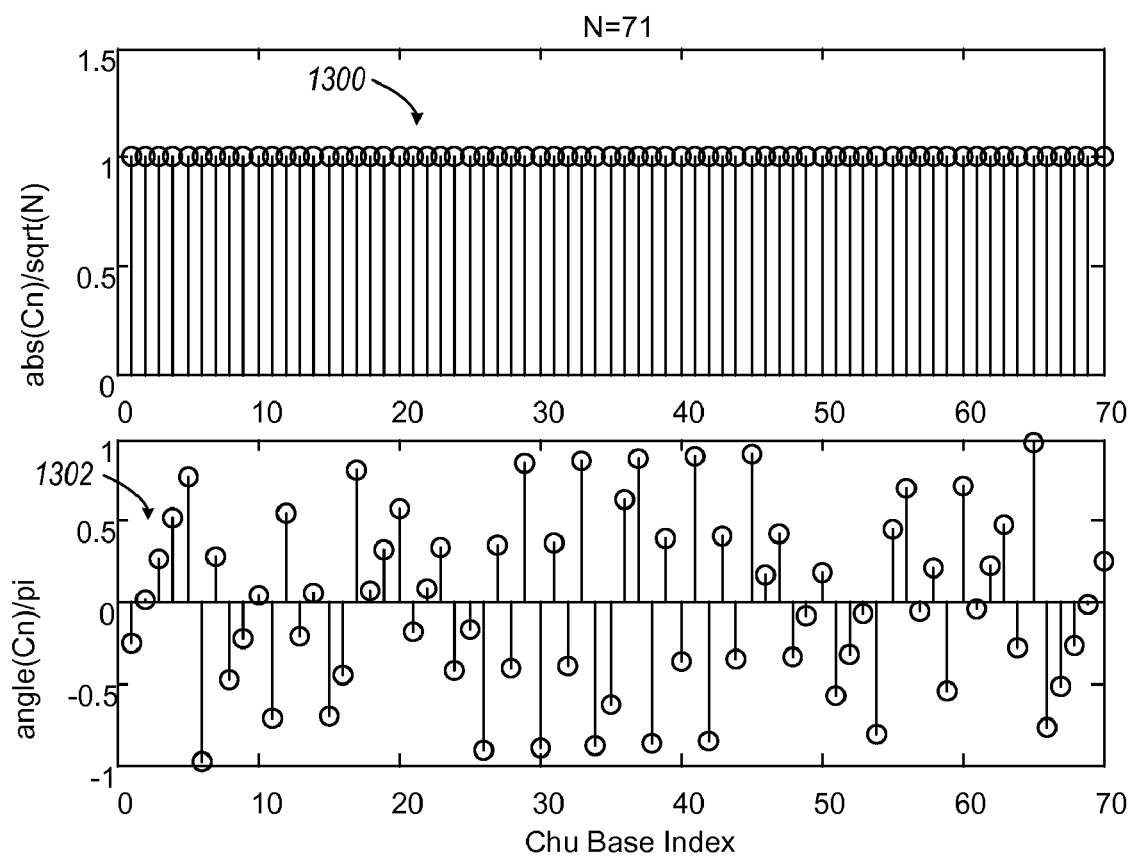
FIG. 13 depicts a graphical plot for an absolute value of a constant value $C_N(\gamma)$ having phase varying with base index for N=71.

In FIG. 13, a depiction of amplitude 1300 and phase 1302 is provided for $C_N(\gamma)$ for N=71.

Figure 14:
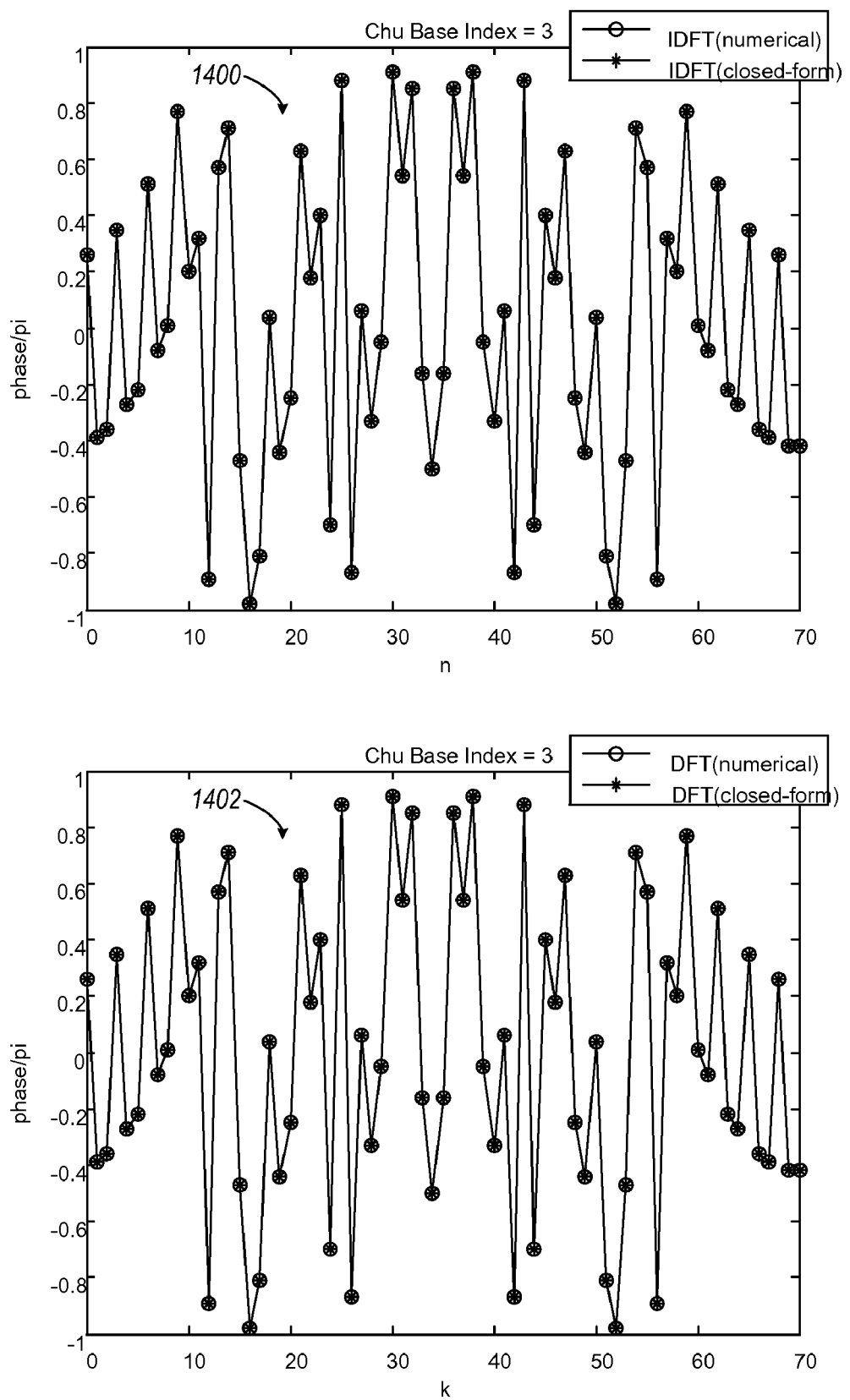
FIG. 14 depicts a graphical plots of numerical versus closed-form calculation of inverse discrete Fourier Transform (IDFT)/discrete Fourier transform (DFT) of Chu sequence of length N=71.

In FIG. 14, a depiction 1400 is given for numerical versus closed-form calculation of IDFT depicted at 1400 and of DFT depicted at 1402 of Chu Sequence (N=71).

CHU SEQUENCE AND CGS GENERATION—SUMMARY. Chu sequences and Computer Generated Sequences (CGS) are used for various purposes in the LTE UL. The following is a summary of their UL applications:

PUCCH demodulation reference signal (DM-RS): Length-12 CGS;

PUCCH data spreading: Length-12 CGS;

PUSCH DM-RS for 1RB and 2RB and Sounding Reference Signal (SRS) with 12 Tones or 24 tones: Length-12 and Length-24 CGS;

PUSCH DM-RS for $\geq$3RB and SRS with more than 36 tones or more: Extended Chu sequence (periodically extended in the frequency domain); and RACH: Length-839 Chu sequence.

We first describe the proposed Chu sequence generator structure and then describe how the same structure can be adapted to generate CGS.

The generic Chu sequence generator formula is given below:

$$x_\lambda(k) = \begin{cases} e^{-j\pi\cdot(\lambda\cdot(k+(N/2))^2+2\omega\cdot k+\phi)/N} & -(N/2) \le k \le (N/2)-1 \quad N = \text{even} \\ e^{-j\pi\cdot(\lambda\cdot(k+((N-1)/2))\cdot(k+((N+1)/2))+2\omega\cdot k+\varphi)/N} & -(N-1)/2 \le k \le (N-1)/2 \quad N = \text{odd} \end{cases}$$

$$g.c.d.(\lambda, N) = 1$$

$$\omega, \varphi = 0$$

Eqn. 34

Note the following:

When extended Chu sequences are used, N is always prime, N is odd, and any $1 \le \lambda < N$ is possible. The only non-extended Chu sequence is the RACH sequence, which is also prime length, so the same holds in general for all LTE Chu sequences.

While $\phi=0$ is true for the un-modulated Chu sequence, any modulation of the Chu sequence could be carried out by adjusting $\phi$. For example, for carrying out QPSK modulation, we can use $\phi \in \{\pi/4, 3\pi/4, 5\pi/4, 7\pi/4\}$.

The sequences are generated in the frequency domain so that the generated sequence can be directly input to the tone mapping. Referring again to FIG. 7 where the generated sequence, either Chu or CGS, will be input in Stage B 706. Due to the frequency-domain sequence generation, the time domain shifts of the Chu sequences are implemented as phase ramp.

Figure 15:
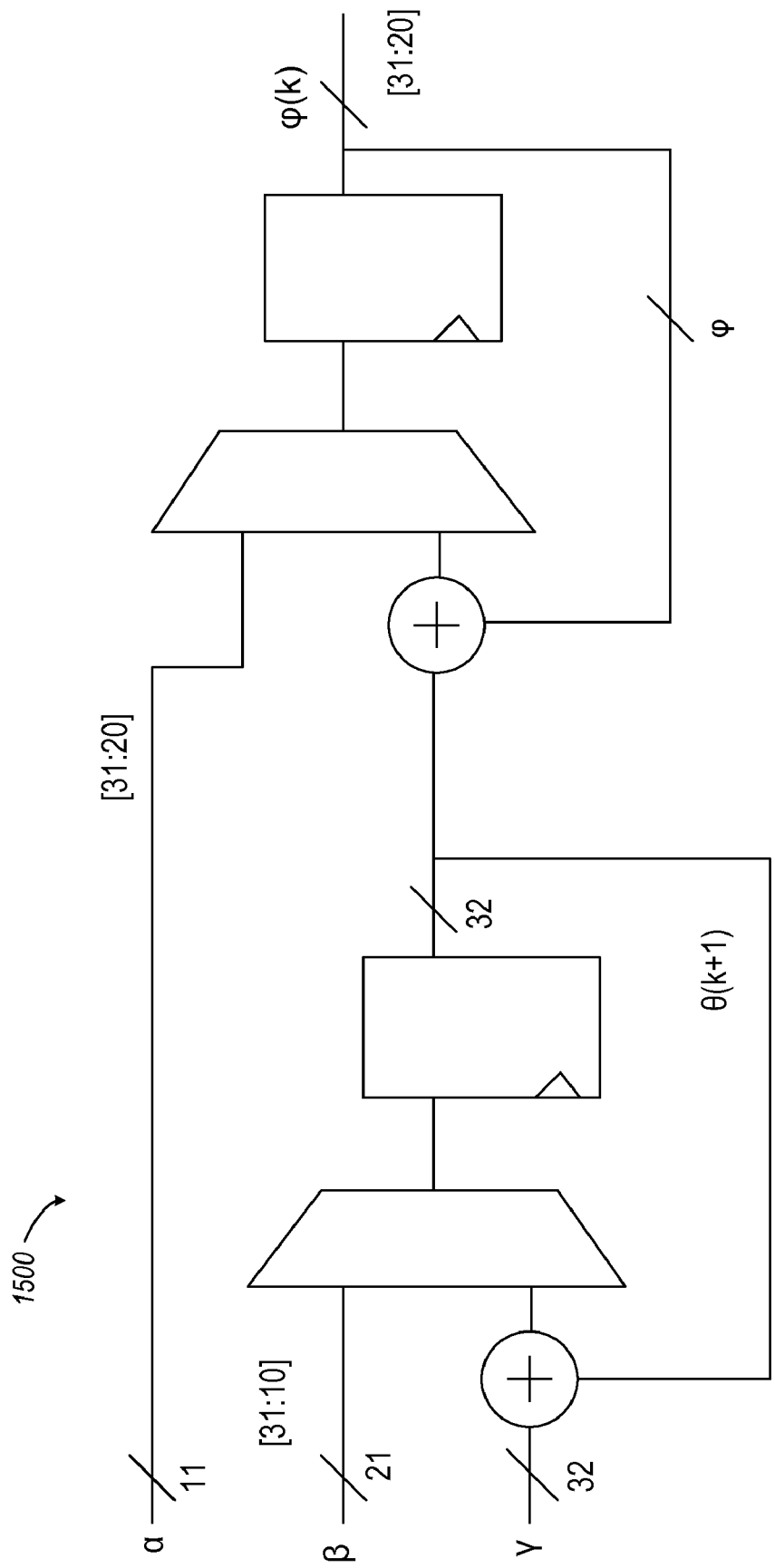
FIG. 15 depicts a block diagram for a recursive Chu sequence generator.

Recursive Sequence Generation. With reference to FIG. 15, since the Chu sequence follows a quadratic-exponential formula, we can generate the phase of the sequence elements with a recursive formula depicts graphically at 1500. Conceptually, the hardware generator 1500 can be described mathematically as $$\varphi(k) = \begin{cases} \alpha, & k = 0 \\ \varphi(k-1) + \theta(k), & 0 < k \le N-1 \end{cases}$$

Eqn. 35

$$\theta(k) = \begin{cases} \beta, & k = 1 \\ \theta(k-1) + \gamma, & 1 < k \le N-1 \end{cases}$$

The above recursive equations lead to the following quadratic formula $$\varphi(k) = \alpha + (\beta - \gamma)k + \gamma\frac{k(k+1)}{2},$$

Eqn. 36

$$k = 0, 1, \ldots (1-1)$$

With the fixed point implementation, the generator signal x(k) is given as $$x(k) = LUT\{LSB_{11x}(\varphi(k))\}$$

Eqn. 37

$$\varphi(k) = \begin{cases} \alpha, & k = 0 \\ LSB_{11}\{\varphi(k-1) + \theta(k)\}, & 0 < k \le N-1 \end{cases}$$

$$\theta(k) = \begin{cases} \beta, & k = 1 \\ LSB_{11}\{\theta(k-1) + \lambda\}, & 1 < k \le N-1 \end{cases}$$

where the signal x(k) at every clock cycle is read from a standard Sin/Cos table (LUT) with 11-bit address given by the phase $\phi(k)$. The notation "$LSB_{11}$" means keeping the 11 LSB bits of the integer part and keeping the fractional part, while "$LSB_{11x}$" means keeping the 11 LSB bits of the integer part after truncation of the fractional bits.

The definition of the various parameters used in FIG. 15 is as follows:

LUT: Sin/Cos look up table defined as $\phi(k)$: Output phase, used to address sin/cos look up table (LUT);

$\theta(k)$: Phase increment value (internal variable);

$\gamma$: Phase acceleration (external parameter) related to the Chu sequence index if the sequence is defined in the frequency domain and is generated in the frequency domain, or related to the negative inverse of the Chu sequence index if the sequence is defined in the time domain and is generated in the frequency domain;

$\beta$: Constant phase increment (external parameter); consists of three components: (1) Offset equals to $\gamma$; (2) Phase ramp corresponding to cyclic time shift; (3) Fourier transform parameter, which is zero if the sequence is defined in the frequency domain and is generated in the frequency domain and non-zero if the sequence is defined in the time domain and is generated in the frequency domain;

$\alpha$: Constant phase (external parameter); consists of two components: (1) Modulation symbol phase, if modulation is incorporated in the sequence generator; and (2) Fourier transform parameter, which is zero if the sequence is defined in the frequency domain and is generated in the frequency domain and non-zero if the sequence is defined in the time domain and is generated in the frequency domain.

The frequency domain extension of the Chu sequence can be created by simply continuing to clock the recursive generator. Since the Chu sequence naturally wraps around with period N, this gives a perfect extension from length period N to length N', except for fixed point rounding errors. The frequency domain phase ramp used to carry out the time domain cyclic shift wraps around with period N', rather than with period N, but this is also properly handled by the continued use of the recursive generator.

As mentioned above, some of the parameter values are external parameters; however, they may not be signaled directly in general. In the following subsection, we describe the signaled parameters and their conversion to sequence generator input parameters.

Calculating Input Parameters—PUSCH DM-RS. The reference signal for PUSCH of 3RB or larger is a Chu sequence specified directly in the frequency domain (and thus no DFT operation in FIG. 7).

$$x(k) = \exp\left\{-j\frac{2\pi kS}{N'}\right\}\exp\left\{-j\frac{\pi qk(k+1)}{N}\right\}, 0 \le k < N',$$

Eqn. 38 where N': number of occupied tones (Stage B 706, FIG. 7), always multiple of 12, N: Chu sequence natural length (Stage B 706, FIG. 7), largest prime number less than N', q: the root of Chu sequence; and S: time domain shift, x(n−S), as implemented as a frequency ramping.

From equation $$\varphi(k) = \alpha + (\beta - \gamma)k + \gamma \frac{k(k+1)}{2}, \quad \text{Eqn. 39}$$
$$k = 0, 1, \ldots (1-1),$$

we can computer the input parameters to the hardware generator $\alpha=0$;

$$\gamma = ODR_{U11.21}\left\{\frac{2048*q}{N}\right\}; \text{ and} \quad \text{Eqn. 40}$$

$$\beta = ODR_{U11.10}\left\{\gamma + \frac{2048*S}{N'}\right\}.$$

The notation $ODR_{ULF}$ means the Odd Dithered Rounding to an unsigned number of I-integer bits and F-fractional bits.

Calculating Input Parameters—PRACH (Physical Random Access Channel). The PRACH signal is a natural length Chu sequence specified in the time domain. It is applied, after DFT, to frequency domain. A closed form formula has been found for the DFT of a Chu sequence based on which we can compute the hardware input parameters.

In the following, we give a list of signaled parameters. Referring back to FIG. 7, the following notation is used:

N': number of occupied tones (Stage B 706), always multiple of 12;

F: RB offset (Stage C 710), not Chu sequence specific, will be ignored here;

N: Chu sequence modulus (Stage A 702 and Stage B 706), greatest prime number less than N';

λ: the base index (Stage A 702), g.c.d.(λ, N)=1. Since N is a prime, this condition is automatically satisfied. There could be a set of ~30 possible λ values specified for each N; and a: time shift value (Stage D 714), should be from the set {0, 1, . . . , 11}. The actual signaled parameter can be the parameter value itself or an index pointing to the parameter value within a standard set.

Next, we give the internal mapping: {N, N', λ, a}↔{α, β, γ}. Note that the assumed example bit resolutions are the same as in FIGS. 7 and 15.

$$\gamma=2048\cdot((-1/\lambda)\bmod N)/N;$$

Keep 21 fractional bits
Example: λ=3, N=31 (N'=36)↔γ=2048·(31−21)/31=660.6451 . . . .

$$\beta=\gamma+2048\cdot m(N,\lambda)+2048\cdot a/12;$$

Keep 10 fractional bits;
m(N, λ) is calculated as follows:

```
/******** Compute the initial phase ramp **********************/

/****** Use closed form solution ************ **********/ int temp_beta;

temp_beta = (((_N-_Lambda)*(_N-_Lambda-1))/2) % _N;

temp_beta = (temp beta * _Lambda_in) % _N;

// (remove unnecessary computation by ke)

//temp_beta = (temp_beta * _Lambda_in) % _NPG;

//temp_beta = (temp_beta * _Lambda) % _NPG;

//_Beta1 = double(staticExpLUT_size) * double((_NPG-
temp_beta)%_NPG)/double(_NPG);   //_Beta1 accounts for DFT effect // (hardware compliance, changed by ke)

_Beta1 = double(staticExpLUT_size) * double((_Lambda+temp_beta)%_NPG) /
double(_NPG); //_Beta1 accounts for DFT effect _Beta2 = double(staticExpLUT_size) * double(_B) / double(_BN);

//_Beta2 accounts for targeted output time shift

/******** End computing the initial phase ramp ****************/
```

Note that in the above, the following notation was used:
_N=N
_Lambda_in=λ
_Lambda=((−1/λ)mod N)/N
_B/_BN=a/12
α=α(N, λ)

The values come from a limited set, so indexing should be possible; however, closed form solution is given below. Alternative solution is to compute the DC value of the time domain sequence but this is disadvantaged from a complexity perspective. No fractional bits in fixed point α, value is an integer in the range [0 . . . 2047].

```
                α(N, λ) is calculated as follows
/******** Here initial phase is calculated with a closed form ***********/
        word16 isQR = 0; //Is _Lambda_in a quadratic residue?
        for (word16 k=1; k<_N; k++) {
                if ((k*k)%_N == _Lambda_in) {
                        isQR = 1;
                }
        }
        word16 qp; //Variable to store the 90 degree rotation index
        word16 m1, m2, m3;     //Temp internal variables
        m1 = _N % 8;
        m2 = (_Lambda_in-1) % 4;
        m3 = ((_Lambda_in-1)/4) % 2;
if (m1==7) {
                if (m2==1 || m2==2) {
                        qp = 2*((isQR+m3)%2);
                }
                else {
                        qp = 2*((isQR+m3)%2)+1;
                }
                if (m2>0) {
                        qp = (qp+2)%4;
                }
}
if (m1==1) {
                if (m2>1) {
                        qp = 2*((isQR+m3)%2);
                }
                else {
                        qp = 2*((isQR+m3)%2)+1;
                }
}
if (m1==5) {
                if (m2>1) {
                        qp = 2*((isQR+m3)%2);
                }
                else {
                        qp = 2*((isQR+m3)%2)+1;
                }
                if (m2%2==1) {
                        qp = (qp+2)%4;
                }
}
if (m1==3) {
                if (m2==1 || m2==2) {
                        qp = 2*((isQR+m3)%2);
                }
                else {
                        qp = 2*((isQR+m3)%2)+1;
                }
                if (m2==2) {
                        qp = (qp+2)%4;
                }
}
        int int_angle;
        if (_Lambda_in%2 == 1) { //Calculate (_Lambda_in / 2) in the cyclic group
of integers mod _N
                int_angle = (_N+_Lambda_in) / 2;
        }
        else {
                int_angle = _Lambda_in / 2;
        }
        int_angle += qp*_N;    //Add appropriate multiple of 90 degree rotations
        int_angle %= 4*_N;
        _Alpha = double(staticExpLUT size) * double(4*_N-
int_angle)/double(_N)/4.0;
        /******** End computing the initial phase *********************/
```

Storing the Sequence Generator Input Parameters. The closed form calculations can be avoided if parameters {α, β, γ} are stored. In order to determine the required memory to support this, first consider the number of cases for N' as shown in TABLE 7 below.

TABLE 7

Chu Sequence Cases

| Sequence | Bandwidth (MHz) | Extended Sequence Length, N' |
|---|---|---|
| Uplink PUSCH DM RS | 1.4 | 12*k, k = 3, 4, 5, 6 |
| | 3.0 | 12*k, k = 3, 4, 5, 6, 8, 9, 10, 12, 15 |
| | 5.0 | 12*k, k = 3, 4, 5, 6, 8, 9, 10, 12, 15, 16, 18, 20, 24, 25 |
| | 10.0 | 12*k, k = 3, 4, 5, 6, 8, 9, 10, 12, 15, 16, 18, 20, 24, 25, 27, 30, 32, 36, 40, 45, 48, 50 |
| | 15.0 | 12*k, k = 3, 4, 5, 6, 8, 9, 10, 12, 15, 16, 18, 20, 24, 25, 27, 30, 32, 36, 40, 45, 48, 50, 54, 60, 64, 72, 75 |
| | 20.0 | 12*k, k = 3, 4, 5, 6, 8, 9, 10, 12, 15, 16, 18, 20, 24, 25, 27, 30, 32, 36, 40, 45, 48, 50, 54, 60, 64, 72, 75, 80, 81, 90, 96, 100, 108 |
| RACH | | 839 |
| SRS | | TBD |

As it can be seen from TABLE 7, there are 33 distinct sequence length cases for the PUSCH DM RS and one length case for the PRACH.

Assume that for each N', 30 sequence indices are defined. Then the storage requirements can be calculated as shown in TABLE 8.

TABLE 8

Parameter Storage Memory Requirements for Time Domain Chu Sequences Generated in the Frequency Domain

| Parameter | Bit-width | Memory Requirement (bits) |
|---|---|---|
| γ | 32 | 33*30*32 = 31680 |
| β | 21 | 33*30*21 = 20790 |
| α | 11 | 33*30*11 = 10890 |

If we wanted to calculate the parameters in TABLE 8 instead of storing them, then for γ, for example, a search for integer reciprocal would be required, which is prohibitively costly.

If the Chu sequences are defined in the frequency domain, then the parameter calculation is simplified since α doesn't need to be calculated and there are only 12 cyclic shift cases for β. The resulting storage requirements are shown in TABLE 9.

TABLE 9

Parameter Storage Memory Requirements for Frequency Domain Chu Sequences Generated in the Frequency Domain

| Parameter | Bit-width | Memory Requirement (bits) |
|---|---|---|
| γ | 32 | 33*30*32 = 31680 |
| β | 21 | 33*12*21 = 8316 |
| α | 11 | 0 |

If we wanted to calculate the parameters {α, β, γ} in TABLE 9 instead of storing them, it would involve only an integer division and binary shift. However, integer division can be costly in hardware, therefore storing the parameter values might be considered. Note that combining parameter storage and calculation can also be implemented, i.e., storing one parameter type while calculating another type.

Sequence Segmentation. Further simplifications could be achieved by using certain properties of the Chu sequences:

For N odd, it is sufficient to generate the first (N+1)/2 elements, the (N−1)/2 elements in the second half are the mirror image $$x((N+1)/2+k)=x((N-1)/2-k), 0 \leq k < (N-1)/2 \qquad \text{Eqn. 41}$$

For N even (doesn't occur in LTE), it would be sufficient to generate the first N/2 elements, the second half is repeated with alternating sign flip $$x(k+N/2)=(-1)^{k+1}x(k), 0 \leq k < N/2 \qquad \text{Eqn. 42}$$

Same principle can be used with N/4, N/8 segmentations when 4 or 8 divides N

Further segmentation is also possible but the sub-segments would then have to be independently generated. This reduces processing time by way of parallelization; but it requires multiple hardware blocks.

CGS Sequence Generation. Computer Generated Sequences (CGS) can be generated with the same structure as shown in FIG. 15. The recursive sequence generator 1500 is used only to generate the phase ramp sequence corresponding to the required cyclic time shift. Input parameter γ is set to zero. Input parameter α can also be set to zero, or alternatively, α can be set to the phase value corresponding to the PUCCH sequence spreading (Hadamard or DFT) or to the CQI data modulation. The latter options avoid an element-wise phase offset after the sequence generation. However, if digital gain is applied to the frequency domain sequence then there is no real savings with this solution.

CGS are frequency domain QPSK sequences, so the discrete sequence elements need to be stored. Since the structure shown in FIG. 15 only generates the phase ramp sequence, the QPSK element-wise modulation needs to be applied separately. This can be easily achieved by the following operation modifying φ(k):

$$\phi'(k)=(\phi(k)+256+512 \cdot s(k)) \bmod 2048 \qquad \text{Eqn. 43}$$

where an 11-bit LUT address space is assumed and s(k)∈{0, 1, 2, 3} represents the F-QPSK modulating sequence.

Note that since the LUT only contains the first half-quadrant of the unit circle, i.e., the values corresponding to φ(k)=0, 1, ..., 255, the modulation operation described above doesn't actually change the LUT address but rather changes the sign and I-Q swap operations that are controlled by the 3 MSB of φ(k).

For the 30 different CG sequences, the storage requirement is as follows: (a) 1-RB CGS: 30*12*2=720 bits; and (b) 2-RB CGS: 30*24*2=1440 bits.

The storage requirements could be reduced by using the fact that some of the sequences are frequency reversed (time conjugate) or frequency conjugate (time reversed) versions of another sequence; however, considering the moderate storage requirements, this option seems unnecessary complication.

Fixed Point Implementation. Here we consider bit-width options for the Chu sequence generator. The conclusions are directly applicable to the CGS generator as well.

An illustrative fixed point implementation is used to simulate the various bit-width options. The following settings were assumed: (a) Sequence length=1201 (CHUTestSize=1201); (b) Sequence Extension Off; (c) DFT On (CHUTestDFT=1); (d) Lambda=27 (CHUTestLambda=27); and (e) Cyclic shift=⅔ of symbol length (CHUTestB=8, CHUTestBN=12).

Figure 16:
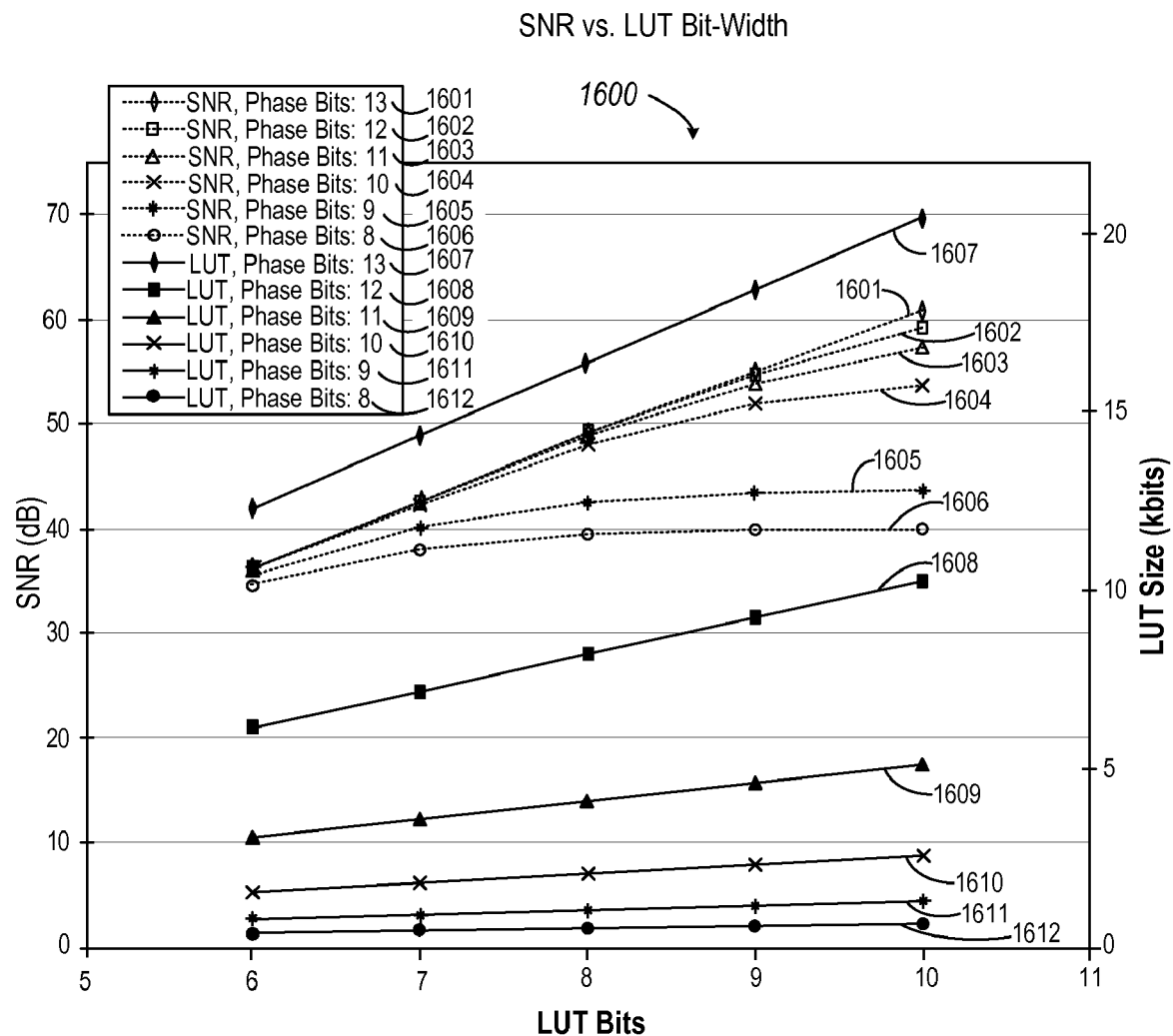
FIG. 16 depicts a graphical plot of Chu sequence signal-to-noise ratio (SNR) and lookup table (LUT) memory size as a function of LUT address size (phase bits) and LUT data bit-width (LUT bits).

In the first set of results, we compare various options for the look up table (LUT) implementation. FIG. 16 shows results corresponding to the different LUT cases. For these results, we used the following settings: (a) CHUAlphaBits=ChuPhaseBits; (b) CHUBetaBits=21; and (c) CHUGammaBits=30.

In FIG. 16, a graphic 1600 is depicted for Chu Sequence SNR and LUT memory size as a function of LUT address size (Phase Bits) and LUT data bit-width (LUT bits). For each case, there are two curves included, one shows the output sequence SNR (referenced to the left y-axis), the other shows the total LUT size (referenced to the right y-axis). SNR plots are depicted for thirteen (13) phase bits 1601, twelve (12) phase bits 1602, eleven (11) phase bits 1603, ten (10) phase bits 1604, nine (9) phase bits 1605, and eight (8) phase bits 1606. LUT plots are depicted for thirteen (13) phase bits 1607, twelve (12) phase bits 1608, eleven (11) phase bits 1609, ten (10) phase bits 1610, nine (9) phase bits 1611, and eight (8) phase bits 1612.

Based on the results shown in FIG. 16, assuming a required minimum SNR of 50 dB, the optimum choice is 10 phase bits paired with 9 LUT data bits. The resulting data structure is: (a) 128 values of $\sin(\phi)$ each quantized to 9 bits; and (b) 128 values of $\cos(\phi)$ each quantized to 9 bits, which results in a total LUT size of 288 bytes.

Note that we can use the fact that the LUT data sign is always positive for the stored values, which reduces the required number of bits by one; therefore the LUT can be implemented using 256 bytes of memory. Note that the above is a change relative to the earlier assumption of 11-bit phase and 8-bit data.

Using 11-bit phase and 9-bit data would improve SNR by about 1 . . . 2 dB at the cost of doubling the LUT size. This is also a possible option; the final decision should be made based on hardware cost.

Figure 17:
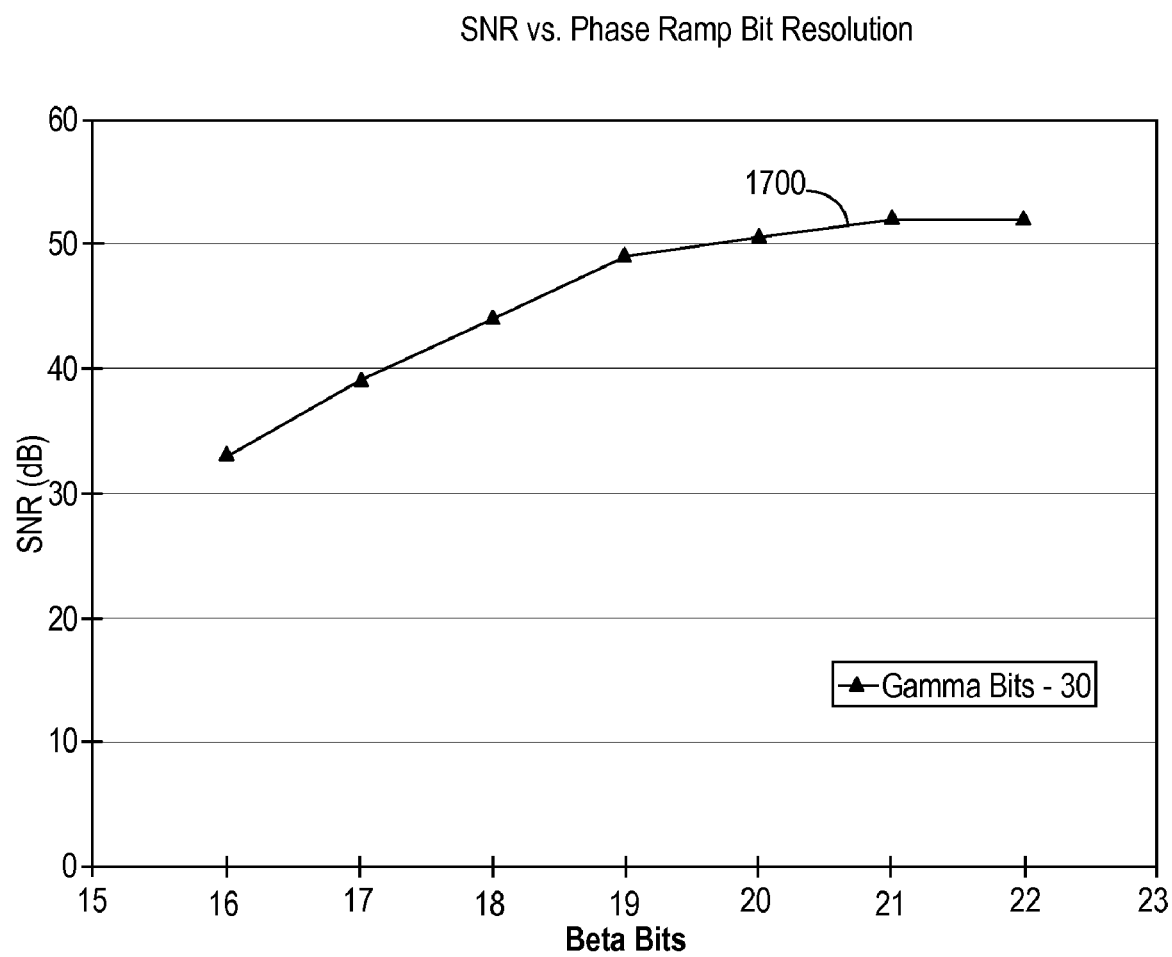
FIG. 17 depicts a graphical plot of Chu sequence SNR as a function of phase ramp (beta) bit resolution.

Next, we look at the required phase ramp ($\beta$) bit resolution. FIG. 17 shows at 1700 results corresponding to the different phase ramp bit-width settings, in particular Chu sequence SNR as a function of phase ramp (Beta) bit resolution. For these results, the following was assumed: (a) CHUAlphaBits=ChuPhaseBits=10; and (b) CHULUTBits=9. The remainder of the simulation assumptions was as described earlier. As it can be seen from FIG. 17, twenty one (21) bits seem to be a good choice, which matches the earlier assumption.

Figure 18:
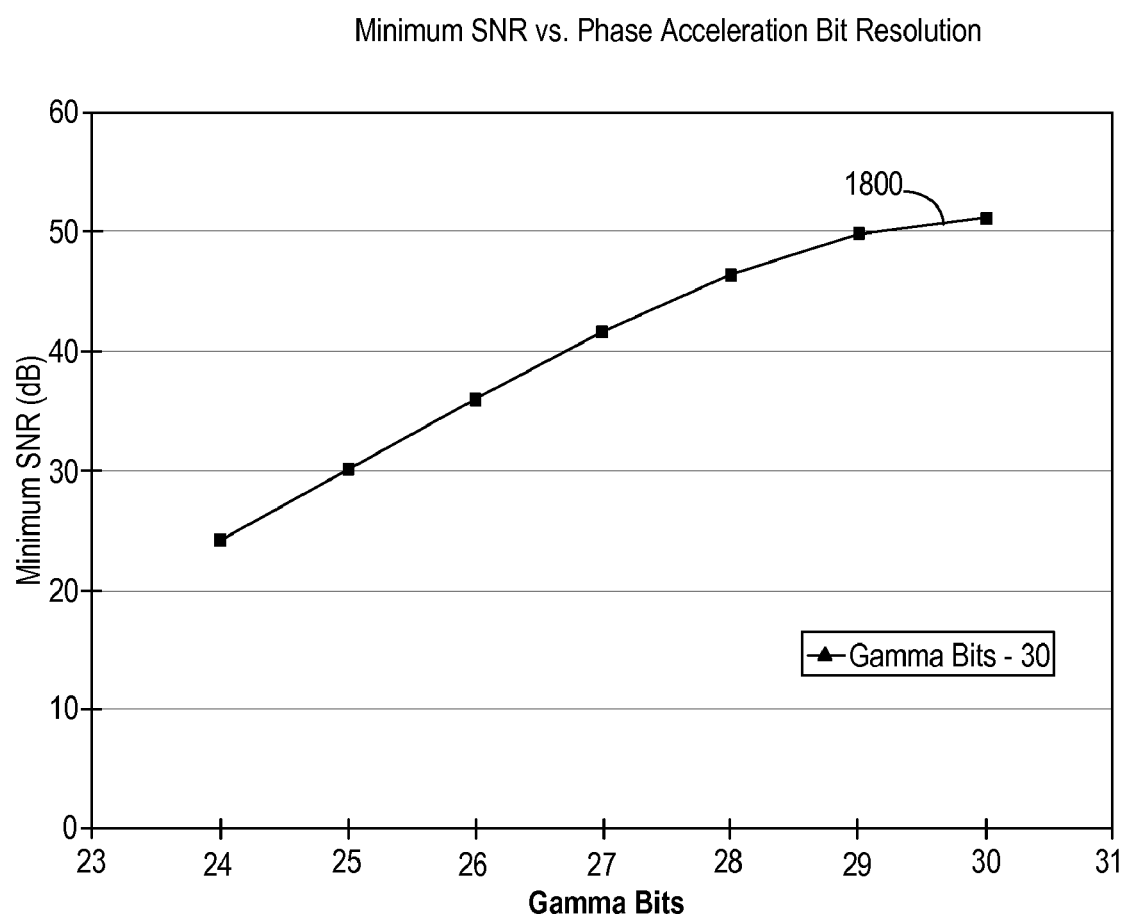
FIG. 18 depicts a minimum Chu sequence SNR as a function of phase acceleration (gamma) bit resolution.

Next, we look at the SNR sensitivity to the phase acceleration ($\gamma$) bit resolution. The earlier assumption was CHUGammaBits=32; however, with the BPM fixed point implementation, only up to 30 bit resolution can be supported, therefore we tested up to 30 bit accumulator length. The assumptions were as follows:
CHUAlphaBits=ChuPhaseBits=10;
CHULUTBits=9;
Sequence length=1201;
DFT Off The SNR was evaluated by finding the minimum SNR for any sequence with any possible sequence index $1 \leq \lambda < 1201$. We show the results for minimum Chu sequence SNR as a function of phase acceleration (Gamma) bit resolution at 1800 in FIG. 18. CHUGammaBits=30 is shown to give acceptable performance. However, the recommendation is to use CHUGammaBits=32 as originally assumed.

Fixed Point Simulation Conclusion. Based on the results presented here, the following recommendations are given: (a) CHUAlphaBits=ChuPhaseBits=10; (b) CHULUTBits=9; (c) ChuBetaBits=21; and (d) ChuGammaBits=32. ChuGammaBits=31, 30 are also acceptable choices.

Performance Results. The initial performance results have been presented above. With the recommended bit-widths, the generated sequence SNR will be above 50 dB. Note that the subsequent IFFT operation may limit the achievable SNR to a lower value.

Figure 19:
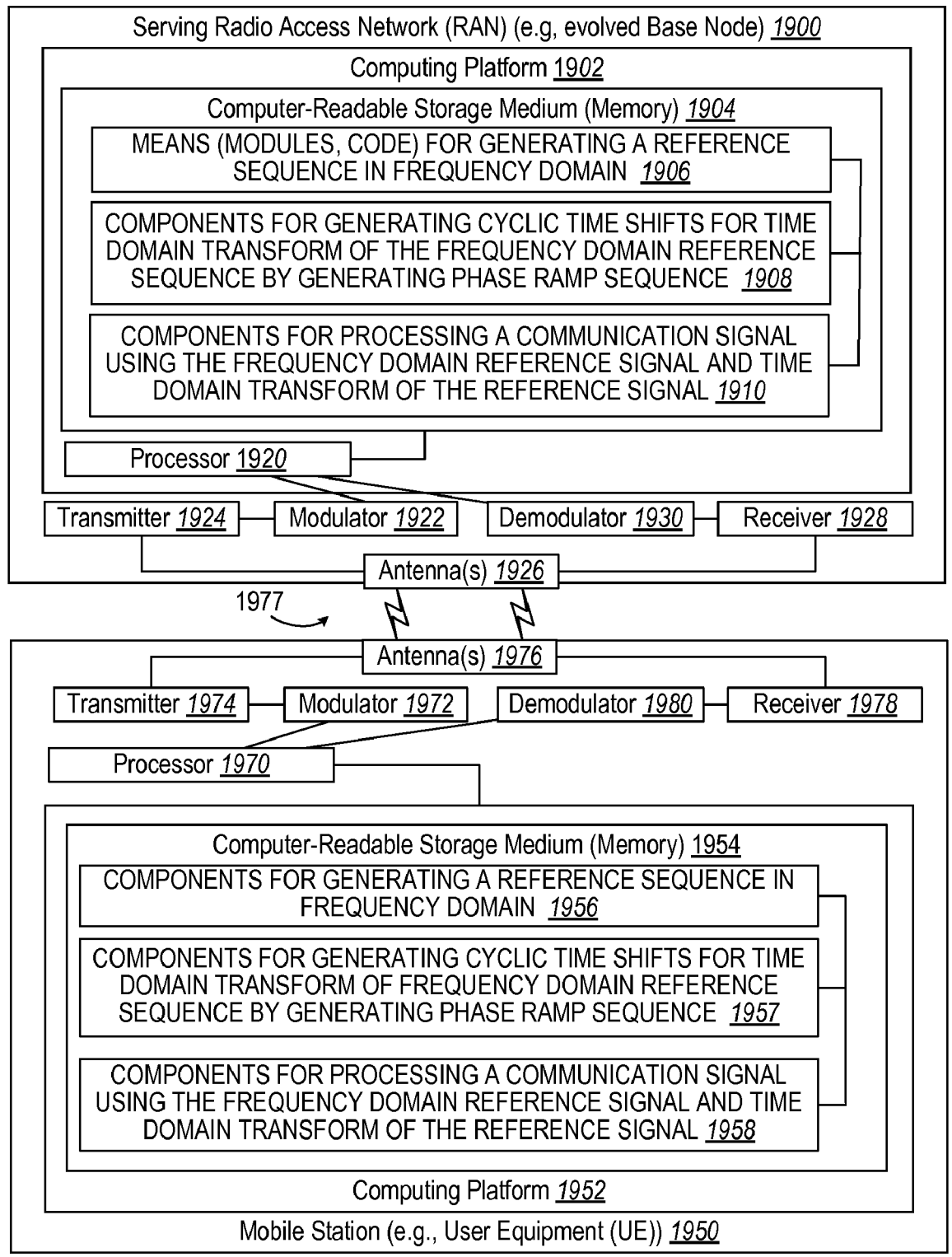
FIG. 19 depicts computing platforms for a base node communicating with user equipment.

In FIG. 19, a serving radio access network (RAN), depicted as an evolved base node (eNB) 1900, has a computing platform 1902 that provides means such as sets of codes for causing a computer to generate a reference sequence for wireless communication. In particular, the computing platform 1902 includes a computer readable storage medium (e.g., memory) 1904 that stores a plurality of modules 1906-1910 executed by a processor(s) 1920. A modulator 1922 controlled by the processor 1920 prepares a downlink signal for modulation by a transmitter 1924, radiated by antenna(s) 1926. A receiver 1928 receives uplink signals from the antenna(s) 1926 that are demodulated by a demodulator 1930 and provided to the processor 1920 for decoding. In particular, component (e.g., module, set of codes) 1906 is provided for generating a reference sequence for wireless communication. Component (e.g., module, set of codes) 1908 is provided for generating cyclic time shifts for a time domain transform of the frequency domain reference sequence by generating a phase ramp sequence. Component (e.g., module, set of codes) 1910 is provided for processing a communication signal using the frequency domain reference signal and time domain transform of the reference signal.

With continued reference to FIG. 19, the mobile station or user equipment (UE) 1950, has a computing platform 1952 that provides means such as sets of codes for causing a computer to perform generation of a reference sequence for wireless communication. In particular, the computing platform 1952 includes a computer readable storage medium (e.g., memory) 1954 that stores a plurality of modules 1956-1958 executed by a processor(s) 1970. A modulator 1972 controlled by the processor 1970 prepares an uplink signal for modulation by a transmitter 1974, radiated by antenna(s) 1976 as depicted at 1977 to the eNB 1900. A receiver 1978 receives downlink signals from the eNB 1900 from the antenna(s) 1976 that are demodulated by a demodulator 1980 and provided to the processor 1970 for decoding. In particular, component (e.g., module, set of codes) 1956 is provided for generating a reference sequence in frequency domain. Component (e.g., module, set of codes) 1957 is provided for generating cyclic time shifts for a time domain transform of the frequency domain reference sequence by generating a phase ramp sequence. Component (e.g., module, set of codes) 1958 is provided for processing a communication signal using the frequency domain reference signal and time domain transform of the reference signal.

Figure 20:
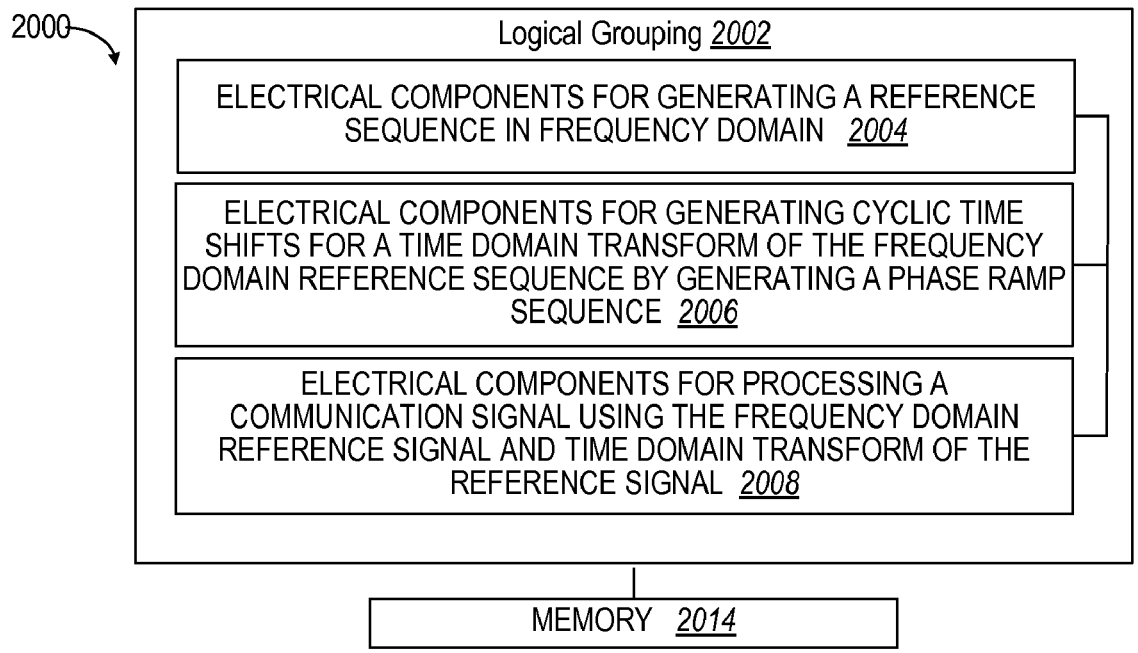
FIG. 20 depicts a communication system having logical grouping of electrical components for generation of a reference signal for wireless communication.

With reference to FIG. 20, illustrated is a system 2000 for generation of a reference sequence for wireless communication. For example, system 2000 can reside at least partially within user equipment (UE). It is to be appreciated that system 2000 is represented as including functional blocks, which can be functional blocks that represent functions implemented by a computing platform, processor, software, or combination thereof (e.g., firmware). System 2000 includes a logical grouping 2002 of electrical components that can act in conjunction. For instance, logical grouping 2002 can include an electrical component for generating a reference sequence in frequency domain 2004. For another instance, logical grouping 2002 can include an electrical component for generating cyclic time shifts for a time domain transform of the frequency domain reference sequence by generating a phase ramp sequence 2006. Further, logical grouping 2002 can include an electrical component for processing a communication signal using the frequency domain reference signal and time domain transform of the reference signal 2008. Additionally, system 2000 can include a memory 2014 that retains instructions for executing functions associated with electrical components 2004-2008. While shown as being external to memory 2014, it is to be understood that one or more of electrical components 2004-2008 can exist within memory 2014.

Figure 21:
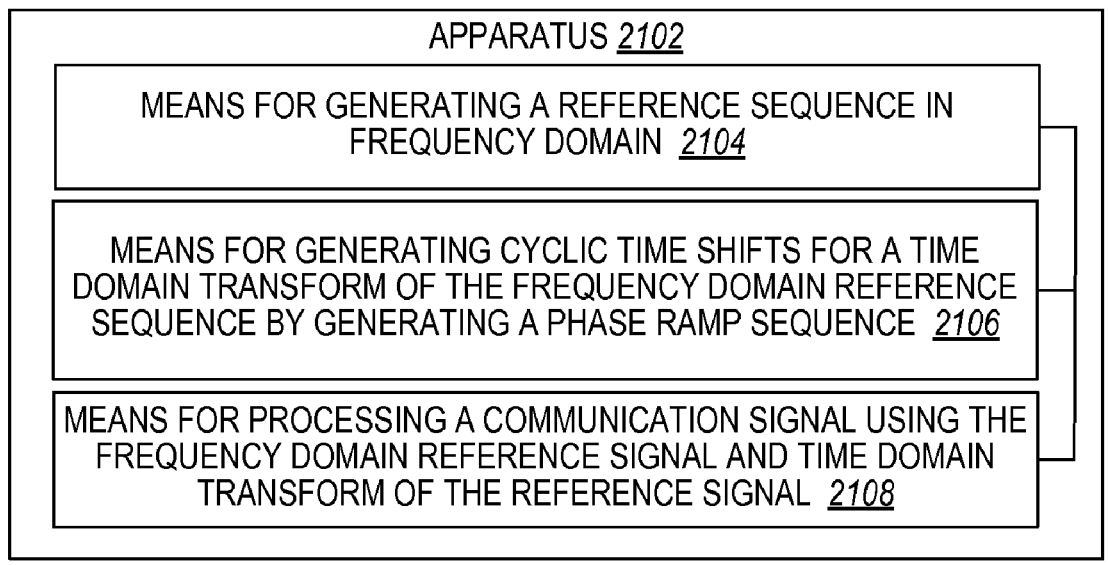
FIG. 21 depicts an apparatus having means for generation of a reference signal for wireless communication.

In FIG. 21, an apparatus 2102 is provided for generation of a reference sequence for wireless communication. A means 2104 is provided for generating a reference sequence in frequency domain. A means 2106 is provided for generating cyclic time shifts for a time domain transform of the frequency domain reference sequence by generating a phase ramp sequence. A means 2108 is provided for processing a communication signal using the frequency domain reference signal and time domain transform of the reference signal.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture is intended to comprise, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "possess," "possessing," or variants thereof are used in either the detailed description or the claims, such terms are intended to be inclusive in a manner similar to the term "comprising" as "comprising" is interpreted when employed as a transitional word in a claim.

What is claimed is:

1. A method for generation of a reference sequence for wireless communication, comprising:
generating a reference sequence in frequency domain;
generating cyclic time shifts for a time domain transform of the frequency domain reference sequence by generating a phase ramp sequence;
using a lookup table to retrieve the frequency domain reference sequence and time domain transform of the reference sequence in response to a length for the reference sequence being less than a threshold;
using an on-time recursive sequence generator to generate the frequency domain reference sequence and time domain transform of the reference sequence in response to the length for the reference sequence being equal to or greater than the threshold; and
processing a communication signal using the frequency domain reference sequence and time domain transform of the reference sequence.

2. The method of claim 1, further comprising generating a fixed length computer generated sequence.

3. The method of claim 1, wherein the recursive sequence generator further comprises an arbitrary sequence generator and a Zadoff-Chu (ZC) sequence generator multiplexed together by a multiplexer.

4. The method of claim 3, further comprising generating a sounding reference sequence occupying one orthogonal frequency division multiple (OFDM) symbol during PUSCH or PUCCH (uplink shared or control channel) transmission subframe for transmission by user equipment (UE) or demodulation by a base node.

5. The method of claim 3, further comprising generating a physical uplink shared channel (PUSCH) demodulation reference signal (DM-RS) for three or more resource blocks (RBs) and a sounding reference signal (SRS) with thirty-six or more tones by generating an extended computer generated sequence periodically extended in the frequency domain.

6. The method of claim 3, further comprising generating a physical control channel (PUCCH) demodulation reference signal (DM-RS) by generating a length 12 computer generated sequence.

7. The method of claim 3, further comprising performing physical control channel (PUCCH) data spreading using length 12 computer generated sequence.

8. The method of claim 3, further comprising generating physical uplink shared channel (PUSCH) demodulation reference signal (DM-RS) for one resource block (RB) or two RB and a sounding reference signal (SRS) with twelve or twenty-four tones respectively by generating a length 12 or length 24 computer generated sequence.

9. The method of claim 1, further comprising generating a Zadoff-Chu sequence.

10. The method of claim 9, further comprising extending or truncating the Zadoff-Chu sequence by respectively stopping earlier or later than a period for the Zadoff-Chu sequence.

11. The method of claim 9, further comprising generating a random access channel by generating a length 839 Zadoff-Chu sequence.

12. The method of claim 1, further comprising encoding or spreading a communication signal for transmission using the reference sequence.

13. The method of claim 1, further comprising decoding or despreading a received communication signal using the reference sequence.

14. The method of claim 1, further comprising generating the reference sequence at user equipment (UE).

15. The method of claim 1, further comprising generating the reference sequence at a base node.

16. A method for generation of a reference sequence for wireless communication, comprising:
generating a reference sequence in frequency domain;
generating cyclic time shifts for a time domain transform of the frequency domain reference sequence by generating a phase ramp sequence; and
processing a communication signal using the frequency domain reference sequence and time domain transform of the reference sequence,
wherein the reference sequence comprises a Zadoff-Chu (ZC) sequence that is a quadratic-exponential formula having elements whose phase can be generated from a recursive formula.

17. The method of claim 16, further comprising utilizing recursive sequence generator circuitry that performs a quadratic formula:

$$\varphi(k) = \alpha + (\beta - \gamma)k + \gamma\frac{k(k+1)}{2}, k = 0, 1, \ldots,$$

where φ(k) is an output phase used to address a sine/cosine lookup table (LUT) defined as exp{−j2πk/(M+1)} for 0≤k≤M; γ is phase acceleration related to Chu sequence index for the frequency domain reference sequence and related to a negative inverse of the Chu sequence index for a reference sequence defined in time domain and generated in frequency domain; β is constant phase increment consisting of an offset component equaling γ, phase ramp component corresponding to cyclic time shift, and Fourier transform parameter component that is zero for reference sequence defined in frequency domain and generated in frequency domain and is conversely non-zero; and α is constant phase that selectively consists of a modulation symbol phase component and a Fourier transform parameter component that is zero for reference sequence defined in frequency domain and generated in frequency domain and is conversely non-zero.

18. A method for generation of a reference sequence for wireless communication, comprising:
generating a reference sequence in frequency domain;
generating cyclic time shifts for a time domain transform of the frequency domain reference sequence by generating a phase ramp sequence; and
processing a communication signal using the frequency domain reference sequence and time domain transform of the reference sequence,
wherein generating the reference sequence comprises:
generating a Zadoff-Chu sequence; and
performing recursive formula computation by a recursive sequence generator comprising two digital accumulators and a phase-to-rectangular converter, the latter comprising a sine-cosine lookup table that takes advantage of a Discrete Fourier Transform of a Zadoff-Chu sequence results in another Zadoff-Chu sequence.

19. A computer program product for generation of a reference sequence for wireless communication, comprising:
at least one non-transitory computer readable storage medium storing computer executable instructions comprising:
a set of codes for causing a computer to generate a reference sequence in frequency domain;
a set of codes for causing the computer to generate cyclic time shifts for a time domain transform of the frequency domain reference sequence by generating a phase ramp sequence;
a set of codes for using a lookup table to retrieve the frequency domain reference sequence and time domain transform of the reference sequence in response to a length for the reference sequence being less than a threshold;
a set of codes for using an on-time recursive sequence generator to generate the frequency domain reference sequence and time domain transform of the reference sequence in response to the length for the reference sequence being equal to or greater than the threshold; and
a set of codes for causing the computer to process a communication signal using the frequency domain reference signal and time domain transform of the reference signal.

20. An apparatus for generation of a reference sequence for wireless communication, comprising:
means for generating a reference sequence in frequency domain;
means for generating cyclic time shifts for a time domain transform of the frequency domain reference sequence by generating a phase ramp sequence;
means for using a lookup table to retrieve the frequency domain reference sequence and time domain transform of the reference sequence in response to a length for the reference sequence being less than a threshold;
means for using an on-time recursive sequence generator to generate the frequency domain reference sequence and time domain transform of the reference sequence in response to the length for the reference sequence being equal to or greater than the threshold; and
means for processing a communication signal using the frequency domain reference signal and time domain transform of the reference signal.

21. An apparatus for generation of a reference sequence for wireless communication, comprising:
a processor operatively coupled to a computer readable medium having stored thereon the following computer executable components:
a component for generating a reference sequence in frequency domain;
a component for generating cyclic time shifts for a time domain transform of the frequency domain reference sequence by generating a phase ramp sequence; and
a component for processing a communication signal using the frequency domain reference signal and time domain transform of the reference signal;
a lookup table for retrieving the frequency domain reference sequence and time domain transform of the reference sequence in response to a length for the reference sequence being less than a threshold; and an on-time recursive sequence generator for generating the frequency domain reference sequence and time domain transform of the reference sequence in response to the length for the reference sequence being equal to or greater than the threshold.

22. The apparatus of claim 21, wherein the recursive sequence generator further comprises an arbitrary sequence generator and a Zadoff-Chu (ZC) sequence generator multiplexed together by a multiplexer.

23. The apparatus of claim 21, further comprising a component for generating a fixed length computer generated sequence.

24. The apparatus of claim 23, further comprising a component for generating a sounding reference signal occupying one orthogonal frequency division multiple (OFDM) symbol during PUSCH or PUCCH (uplink shared or control channel) transmission subframe for transmission by user equipment (UE) or demodulation by a base node.

25. The apparatus of claim 23, further comprising a component for generating physical uplink shared channel (PUSCH) demodulation reference signal (DM-RS) for three or more resource blocks (RBs) and a sounding reference signal (SRS) with thirty-six or more tones by generating an extended computer generated sequence periodically extended in the frequency domain.

26. The apparatus of claim 23, further comprising a component for generating a physical control channel (PUCCH) demodulation reference signal (DM-RS) by generating a length 12 computer generated sequence.

27. The apparatus of claim 23, further comprising a component for performing physical control channel (PUCCH) data spreading using length 12 computer generated sequence.

28. The apparatus of claim 23, further comprising a component for generating physical uplink shared channel (PUSCH) demodulation reference signal (DM-RS) for one resource block (RB) or two RB and a sounding reference signal (SRS) with twelve or twenty-four tones respectively by generating a length 12 or length 24 computer generated sequence.

29. The apparatus of claim 21, further comprising a component for generating a Zadoff-Chu sequence.

30. The apparatus of claim 29, further comprising a component for extending or truncating the Zadoff-Chu sequence by respectively stopping earlier or later than a period for the Zadoff-Chu sequence.

31. The apparatus of claim 29, further comprising a component for generating a random access channel by generating a length 839 Zadoff-Chu sequence.

32. The apparatus of claim 21, further comprising a component for encoding or spreading a communication signal for transmission using the reference sequence.

33. The apparatus of claim 21, further comprising a component for decoding or despreading a received communication signal using the reference sequence.

34. The apparatus of claim 21, further comprising a component for generating the reference sequence at user equipment (UE).

35. The apparatus of claim 21, further comprising a component for generating the reference sequence at a base node.

36. An apparatus for generation of a reference sequence for wireless communication, comprising:

a processor operatively coupled to a computer readable medium having stored thereon the following computer executable components:

a component for generating a reference sequence in frequency domain;

a component for generating cyclic time shifts for a time domain transform of the frequency domain reference sequence by generating a phase ramp sequence; and a component for processing a communication signal using the frequency domain reference signal and time domain transform of the reference signal, wherein the reference signal comprises a Zadoff-Chu (ZC) sequence that is a quadratic-exponential formula having elements whose phase can be generated from a recursive formula.

37. The apparatus of claim 36, further comprising utilizing recursive sequence generator circuitry that performs a quadratic formula:

$$\varphi(k) = \alpha + (\beta - \gamma)k + \gamma \frac{k(k+1)}{2}, k = 0, 1, \ldots ,$$

where φ(k) is an output phase used to address a sine/cosine lookup table (LUT) defined as $\exp\{-j2\pi k/(M+1)\}$ for $0 \leq k \leq M$; γ is phase acceleration related to Chu sequence index for the frequency domain reference signal and related to a negative inverse of the Chu sequence index for a reference signal defined in time domain and generated in frequency domain; β is constant phase increment consisting of an offset component equaling γ, phase ramp component corresponding to cyclic time shift, and Fourier transform parameter component that is zero for reference signal defined in frequency domain and generated in frequency domain and is conversely non-zero; and α is constant phase that selectively consists of a modulation symbol phase component and a Fourier transform parameter component that is zero for reference signal defined in frequency domain and generated in frequency domain and is conversely non-zero.

38. An apparatus for generation of a reference sequence for wireless communication, comprising:

a processor operatively coupled to a computer readable medium having stored thereon the following computer executable components:

a component for generating a reference sequence in frequency domain;

a component for generating cyclic time shifts for a time domain transform of the frequency domain reference sequence by generating a phase ramp sequence;

a component for processing a communication signal using the frequency domain reference signal and time domain transform of the reference signal;

a component of generating a Zadoff-Chu sequence; and a recursive sequence generator for performing recursive formula computation comprising two digital accumulators and a phase-to-rectangular converter, the latter comprising a sine-cosine look up table that takes advantage of a Discrete Fourier Transform of a Zadoff-Chu sequence results in another Zadoff-Chu sequence.

39. An apparatus for generation of a reference sequence for wireless communication, comprising:

means for generating a reference sequence in frequency domain;

means for generating cyclic time shifts for a time domain transform of the frequency domain reference sequence by generating a phase ramp sequence; and means for processing a communication signal using the frequency domain reference sequence and time domain transform of the reference sequence, wherein the reference sequence comprises a Zadoff-Chu (ZC) sequence that is a quadratic-exponential formula having elements whose phase can be generated from a recursive formula.

40. A computer program product for generation of a reference sequence for wireless communication, comprising:
- at least one non-transitory computer readable storage medium storing computer executable instructions comprising:
- a set of codes for generating a reference sequence in frequency domain;
- a set of codes for generating cyclic time shifts for a time domain transform of the frequency domain reference sequence by generating a phase ramp sequence; and
- a set of codes for processing a communication signal using the frequency domain reference sequence and time domain transform of the reference sequence,
- wherein the reference sequence comprises a Zadoff-Chu (ZC) sequence that is a quadratic-exponential formula having elements whose phase can be generated from a recursive formula.

41. An apparatus for generation of a reference sequence for wireless communication, comprising:
- means for generating a reference sequence in frequency domain;
- means for generating cyclic time shifts for a time domain transform of the frequency domain reference sequence by generating a phase ramp sequence;
- means for processing a communication signal using the frequency domain reference sequence and time domain transform of the reference sequence;
- means for generating a Zadoff-Chu sequence; and
- means for performing recursive formula computation by a recursive sequence generator comprising two digital accumulators and a phase-to-rectangular converter, the latter comprising a sine-cosine lookup table that takes advantage of a Discrete Fourier Transform of a Zadoff-Chu sequence results in another Zadoff-Chu sequence.

42. A computer program product for generation of a reference sequence for wireless communication, comprising:
- at least one non-transitory computer readable storage medium storing computer executable instructions comprising:
- a set of codes for generating a reference sequence in frequency domain;
- a set of codes for generating cyclic time shifts for a time domain transform of the frequency domain reference sequence by generating a phase ramp sequence;
- a set of codes for processing a communication signal using the frequency domain reference sequence and time domain transform of the reference sequence;
- a set of codes for generating a Zadoff-Chu sequence; and
- a set of codes for performing recursive formula computation by a recursive sequence generator comprising two digital accumulators and a phase-to-rectangular converter, the latter comprising a sine-cosine lookup table that takes advantage of a Discrete Fourier Transform of a Zadoff-Chu sequence results in another Zadoff-Chu sequence.

* * * * *